US012289019B2

(12) United States Patent
Nishimoto

(10) Patent No.: US 12,289,019 B2
(45) Date of Patent: Apr. 29, 2025

(54) DYNAMO-ELECTRIC MACHINE

(71) Applicant: HIRATA CORPORATION, Kumamoto (JP)

(72) Inventor: Satoshi Nishimoto, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 386 days.

(21) Appl. No.: 17/905,203

(22) PCT Filed: Mar. 25, 2021

(86) PCT No.: PCT/JP2021/012696
§ 371 (c)(1),
(2) Date: Aug. 29, 2022

(87) PCT Pub. No.: WO2021/200591
PCT Pub. Date: Oct. 7, 2021

(65) Prior Publication Data
US 2023/0113985 A1 Apr. 13, 2023

(30) Foreign Application Priority Data
Mar. 31, 2020 (JP) .................. 2020-062082

(51) Int. Cl.
*H02K 11/25* (2016.01)
*H02K 11/215* (2016.01)
(Continued)

(52) U.S. Cl.
CPC ............. *H02K 11/25* (2016.01); *H02K 11/30* (2016.01); *H02K 11/215* (2016.01); *H02K 11/22* (2016.01)

(58) Field of Classification Search
CPC ...... H02K 11/22; H02K 11/215; H02K 11/25; H02K 11/30
See application file for complete search history.

(56) References Cited

U.S. PATENT DOCUMENTS

2006/0002054 A1 1/2006 Anwar et al.
2010/0196174 A1* 8/2010 Lee ..................... F04D 25/082
310/156.53
(Continued)

FOREIGN PATENT DOCUMENTS

EP 3105842 B1 7/2017
EP 2651015 B1 12/2019
(Continued)

OTHER PUBLICATIONS

Extended European Search Report dated Mar. 27, 2024, issued in corresponding European Application No. 21777930.5. (15 pages).
(Continued)

*Primary Examiner* — Jue Zhang
(74) *Attorney, Agent, or Firm* — BUCHANAN, INGERSOLL & ROONEY PC

(57) ABSTRACT

A dynamo-electric machine in one embodiment of the present invention includes a tubular stator, a rotor disposed in an internal space of the stator, a bottomed tubular case that accommodates the stator, an end cover mounted on an open end of the case on one side, and a temperature sensor. The stator includes a stator core having a plurality of protruding portions that protrude toward a center of the stator, insulators mounted on the stator core, and a coil obtained by winding a winding wire around each of the plurality of protruding portions with the insulators therebetween. The temperature sensor is disposed on the end cover side of the stator between bent portions of the winding wires in the adjacent coils.

10 Claims, 12 Drawing Sheets

(51) Int. Cl.
 H02K 11/30 (2016.01)
 H02K 11/22 (2016.01)

(56) References Cited

U.S. PATENT DOCUMENTS

| | | | |
|---|---|---|---|
| 2011/0285218 A1* | 11/2011 | Tsubakimoto | H02K 13/006 |
| | | | 310/68 C |
| 2012/0313467 A1 | 12/2012 | Omae et al. | |
| 2014/0265661 A1 | 9/2014 | Chamberlin et al. | |
| 2015/0078418 A1* | 3/2015 | Suzuki | G01K 13/00 |
| | | | 374/152 |
| 2016/0036305 A1 | 2/2016 | Kawata et al. | |

FOREIGN PATENT DOCUMENTS

| | | |
|---|---|---|
| JP | S6298451 U | 6/1987 |
| JP | 2000069715 A | 3/2000 |
| JP | 2002-223581 A | 8/2002 |
| JP | 3318531 B2 | 8/2002 |
| JP | 3612715 B2 | 1/2005 |
| JP | 2006340580 A | 12/2006 |
| JP | 2008-022679 A | 1/2008 |
| JP | 2008306886 A | 12/2008 |
| JP | 2010130706 A | 6/2010 |
| JP | 2010141962 A | 6/2010 |
| JP | 2010273514 A | 12/2010 |
| JP | 2011239574 A | 11/2011 |
| JP | 2013153544 A | 8/2013 |
| JP | 5396842 B2 | 11/2013 |
| JP | 2015192544 A | 11/2015 |
| JP | 2019075872 A | 5/2019 |
| JP | 2019083611 A | 5/2019 |
| TW | 201828574 A | 8/2018 |
| WO | 2012023245 A1 | 2/2012 |
| WO | 2017098907 A1 | 6/2017 |

OTHER PUBLICATIONS

International Search Report issued in PCT Application No. PCT/JP2021/012696; Mailed Jun. 8, 2021. 5 Pages (with Translation).
IPRP issued in PCT Application No. PCT/JP2021/012696; Mailed Feb. 22, 2022. 8 Pages (with Translation).
Office Action issued in TW Application No. 110111067; Mailed Feb. 10, 2022. 12 Pages (with partial Translation).
Office Action (Communication pursuant to Article 94(3) EPC) issued on Jan. 24, 2025, in corresponding European Patent Application No. 21777930.5. (9 pages).

* cited by examiner

DYNAMO-ELECTRIC MACHINE

TECHNICAL FIELD

The present invention relates to a dynamo-electric machine.

The present invention claims priority based on Japanese Patent Application No. 2020-62082 filed in Japan on Mar. 31, 2020, the contents of which are incorporated herein by reference.

BACKGROUND ART

Conventionally, an inner rotor type brushless DC motor is known in a dynamo-electric machine (refer to, for example, Patent Documents 1 and 2).

For example, Patent Document 1 discloses a structure in which a resin is injected into a motor case. The resin is filled between a stator and the case to leave a space in a center into which a rotor is inserted.

For example, Patent Document 2 discloses a structure including a temperature sensor capable of detecting a temperature of a motor. The temperature sensor is embedded in a coil formed by winding a winding wire around a stator core.

RELATED ART DOCUMENT

Patent Document

Patent Document 1: Japanese Patent No. 3318531
Patent Document 2: Japanese Patent No. 3612715

SUMMARY

Problems to be Solved by the Invention

However, there is room for improving the integrity using a temperature sensor and curbing problems due to heat generation in a motor.

An object of the present invention is to suppress a problem due to heat generation of a dynamo-electric machine using a temperature sensor.

Means for Solving the Problem

As a means for solving the above problems, aspects of the present invention have the following constitutions.

(1) A dynamo-electric machine according to an aspect of the present invention includes a tubular stator, a rotor disposed in an internal space of the stator, a tubular or bottomed tubular case configured to accommodate the stator, an end cover mounted on an open end of the case on one side, and a temperature sensor, wherein the stator includes a stator core having a plurality of protruding portions that protrude toward a center of the stator, an insulator mounted on the stator core, and a coil formed by winding a winding wire around each of the plurality of protruding portions with the insulator therebetween, and the temperature sensor is disposed on the end cover side of the stator between bent portions of the winding wires in the adjacent coils.

(2) In the dynamo-electric machine described in (1) above, the temperature sensor may be in contact with the bent portions of the winding wires.

(3) In the dynamo-electric machine described in (1) or (2) above, a circuit substrate configured to control driving of the dynamo-electric machine may be further included, and the circuit substrate may be disposed inward of an outer end of the case in an axial direction and may also disposed between the stator and the end cover.

(4) In the dynamo-electric machine described in (3) above, the insulator may have a contact portion that comes into contact with a surface of the circuit substrate on the stator side.

(5) In the dynamo-electric machine described in (3) or (4) above, the circuit substrate may have a plurality of engaging portions disposed at intervals in a circumferential direction, and the insulator may have an engaging portion that engages with the circuit substrate through each of the plurality of engaging portions.

(6) In the dynamo-electric machine described in any one of (1) to (5) above, gaps between the case and the insulator and between the plurality of protruding portions in the stator core may be filled with a resin, and the case, the stator and the temperature sensor may be integrated.

(7) In the dynamo-electric machine described in any one of (1) to (6) above, the case may be a tubular case having a tubular shape and may further include a front cover mounted on an open end of the tubular case on the other side and a resin sheet disposed between the front cover and the stator.

(8) In the dynamo-electric machine described in any one of (1) to (6) above, the case may be a bottomed tubular case having a bottom portion on the other side and may further include a resin sheet disposed between the bottom portion and the stator.

(9) In the dynamo-electric machine described in any one of (1) to (8) above, a circuit substrate configured to control driving of the dynamo-electric machine may be further included, the circuit substrate may include a resistor that detects a current supplied to the coil, and the resistor may be provided on a surface of the circuit substrate on the end cover side.

(10) In the dynamo-electric machine described in (9) above, the circuit substrate may further include a plurality of field-effect transistors, and an encoder, and in a plan view, the encoder may be disposed between the field-effect transistor located on a leftmost side among the plurality of field-effect transistors and the resistor.

(11) In the dynamo-electric machine described in (9) above, the circuit substrate may further include a plurality of field-effect transistors, and an encoder, and in a plan view, the resistor may be disposed between the field-effect transistor located on a leftmost side among the plurality of field-effect transistors and the encoder.

Advantage of the Invention

According to the present invention, it is possible to suppress a problem due to heat generation of a dynamo-electric machine using the temperature sensor.

DESCRIPTION OF THE EMBODIMENTS

Hereinafter, embodiments of the present invention will be described with reference to the drawings. In the following description, an inner rotor type brushless DC motor which is an example of a dynamo-electric machine will be described.

First Embodiment

<Dynamo-Electric Machine>

Figure 1:
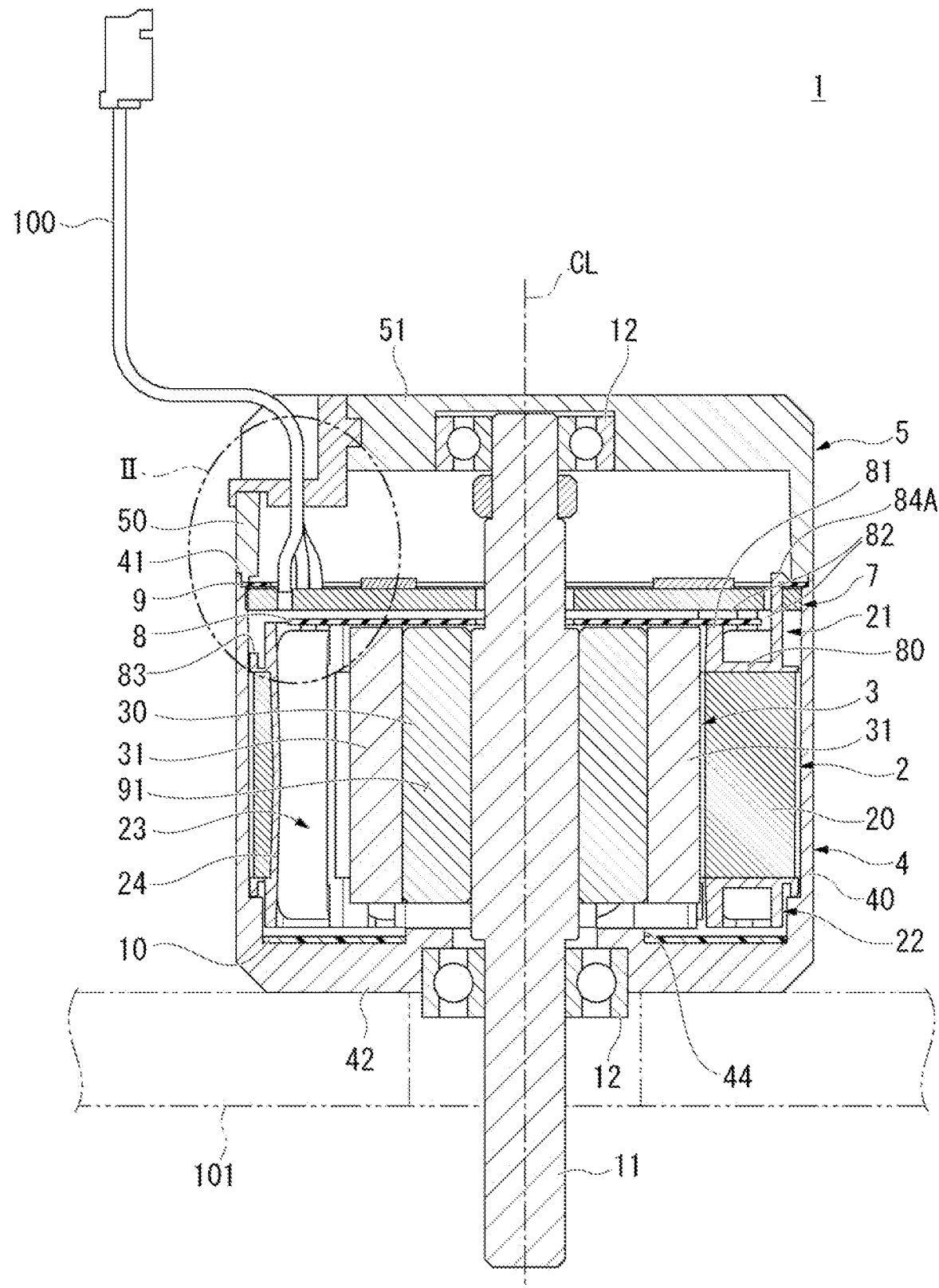
FIG. 1 is a cross-sectional view including an axis of a dynamo-electric machine according to a first embodiment.

As shown in FIG. 1, a dynamo-electric machine 1 includes a stator 2, a rotor 3, a case 4, an end cover 5, a temperature sensor 6 (refer to FIG. 3), a circuit substrate 7, a first insulation sheet 8, a second insulation sheet 9, and a resin sheet 10. In the present embodiment, a stator unit is constituted by providing the stator 2 in the case 4. Further, the stator unit is constituted as a stator unit assembly by providing the temperature sensor 6 and the circuit substrate 7 thereto.

In FIG. 1, a reference numeral 12 indicates a bearing that rotatably supports a shaft 11. The bearing 12 is provided in each of the case 4 and the end cover 5. The shaft 11 of the dynamo-electric machine 1 is rotatably supported by the case 4 and the end cover 5 via the bearings 12. Hereinafter, a direction along an axis CL of the shaft 11 is referred to as an "axial direction," a direction orthogonal to the axis CL is referred to as a "radial direction," and a direction around the axis CL is referred to as a "circumferential direction".

<Stator>

The stator 2 has a cylindrical shape (a tubular shape). The stator 2 includes a stator core 20, insulators 21 and 22, and a coil 23.

For example, the stator core 20 is formed by stacking a plurality of thin iron plate materials (electromagnetic steel plates) in the axial direction. The stator core 20 has an annular shape coaxial with the axis CL. The stator core 20 is fixed to an inner peripheral surface of the case 4.

Figure 9:
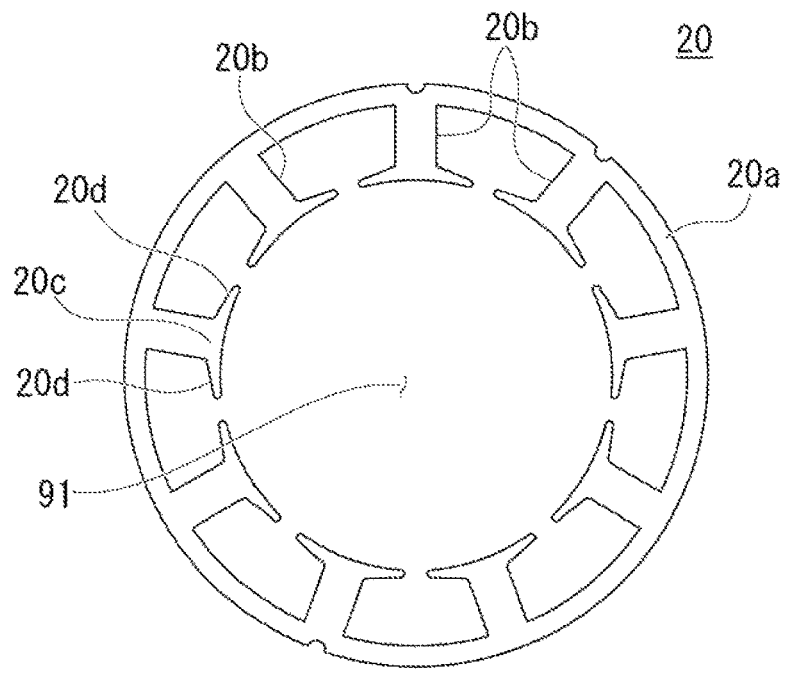
FIG. 9 is a view of a stator core according to the first embodiment when seen in the axial direction.

As shown in FIG. 9, the stator core 20 includes an annular core body 20a, and a plurality of (for example, nine in the present embodiment) protruding portions 20b that protrude from an inner peripheral surface of the core body 20a toward a center in the radial direction (a center of the stator 2) with a predetermined length and are formed with a predetermined length in the axial direction along the inner peripheral surface of the core body 20a.

Each of the protruding portions 20b has a protruding flange portion 20d that extends in the circumferential direction from a protruding end portion 20c which is an inner end portion in the radial direction. In the present embodiment, the protruding flange portions 20d extend on both sides in the circumferential direction to have substantially the same length with the protruding end portion 20c as a boundary therebetween. The nine protruding portions 20b are disposed with substantially the same interval therebetween in the circumferential direction. In the present embodiment, the nine protruding portions 20b are disposed at intervals of approximately 40 degrees (a central angle) in the circumferential direction.

The protruding flange portions 20d provided on each of the protruding portions 20b are disposed at intervals in the circumferential direction. The stator core 20 has a space 91 surrounded by the protruding end portions 20c of the protruding portions 20b.

<Insulator>

Figure 5:
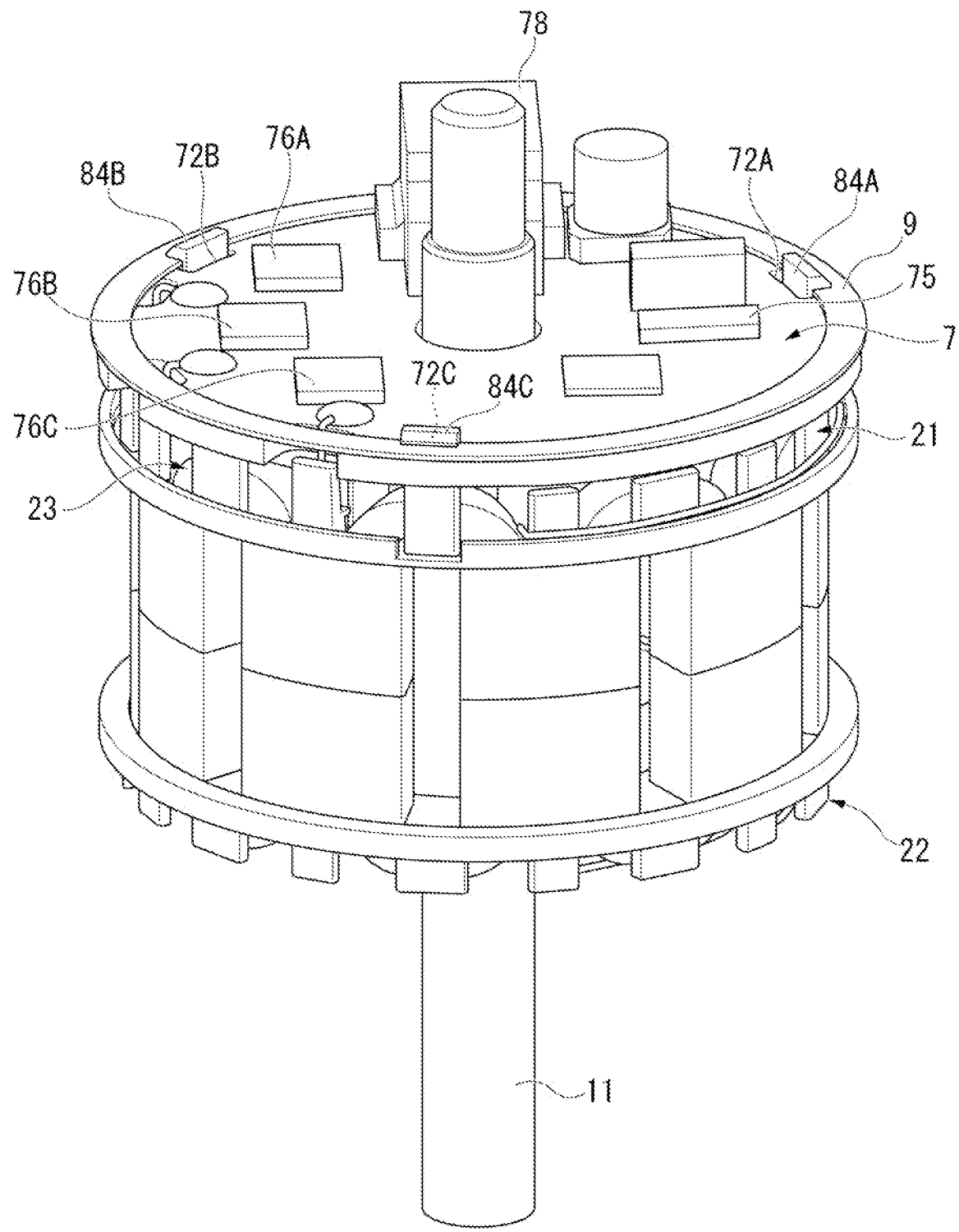
FIG. 5 is a perspective view of the dynamo-electric machine according to the first embodiment when seen from the circuit substrate side.

As shown in FIG. 1, the insulators 21 and 22 are mounted on the stator core 20. The insulators 21 and 22 can be divided in the axial direction (refer to FIG. 5). The insulators 21 and 22 are mounted on an inner peripheral portion of the core body 20a (refer to FIG. 9). The insulators 21 and 22 are mounted on both sides of the stator core 20 in the axial direction. The insulators 21 and 22 are constituted of a first insulator 21 mounted on one side of the stator core 20 in the axial direction and a second insulator 22 mounted on the other side of the stator core 20 in the axial direction. In the present embodiment, the insulators 21 and 22 are formed by combining the first insulator 21 and the second insulator 22.

Figure 3:
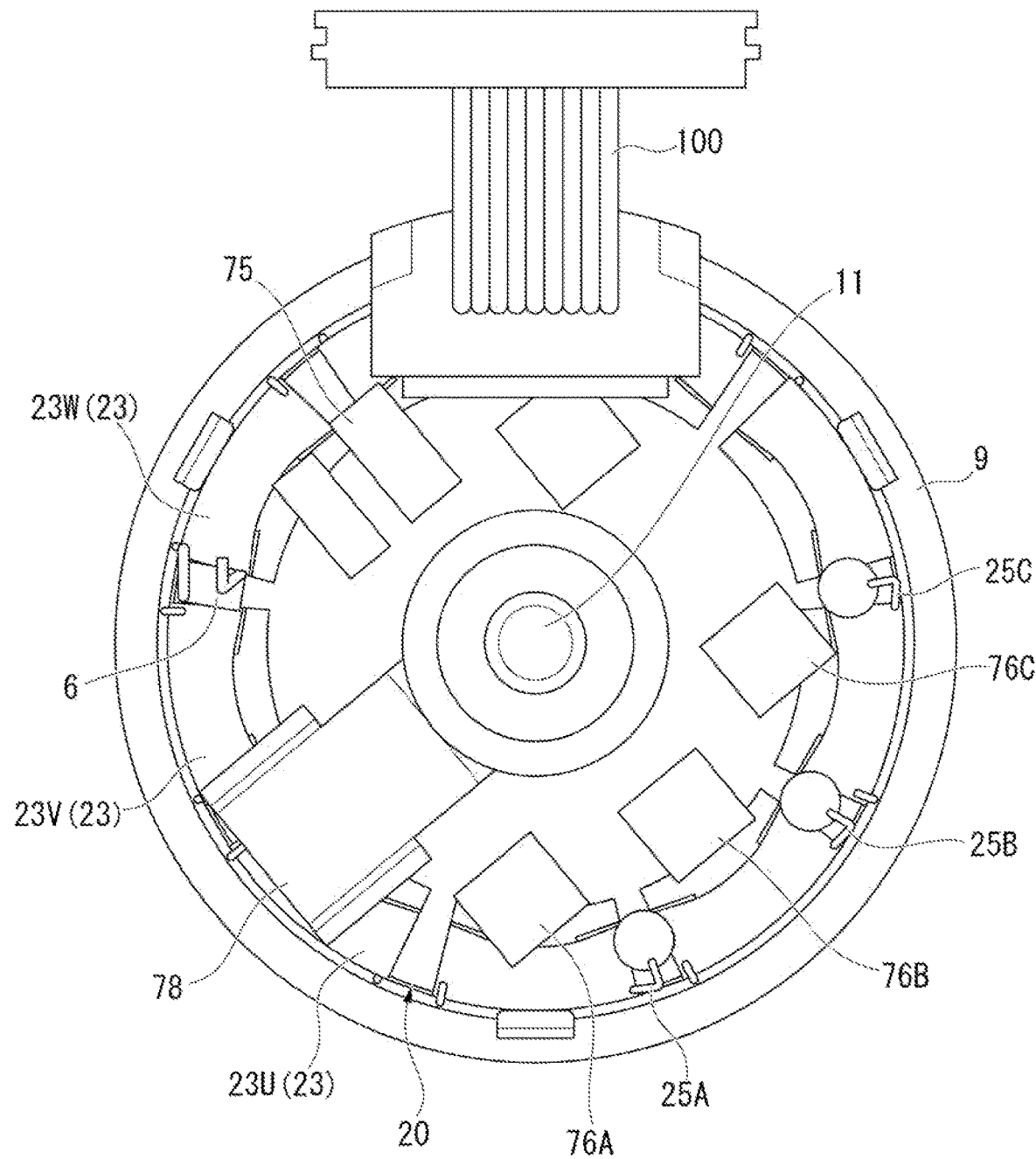
FIG. 3 is a view of the dynamo-electric machine according to the first embodiment when seen from one side in an axial direction.
Figure 4:
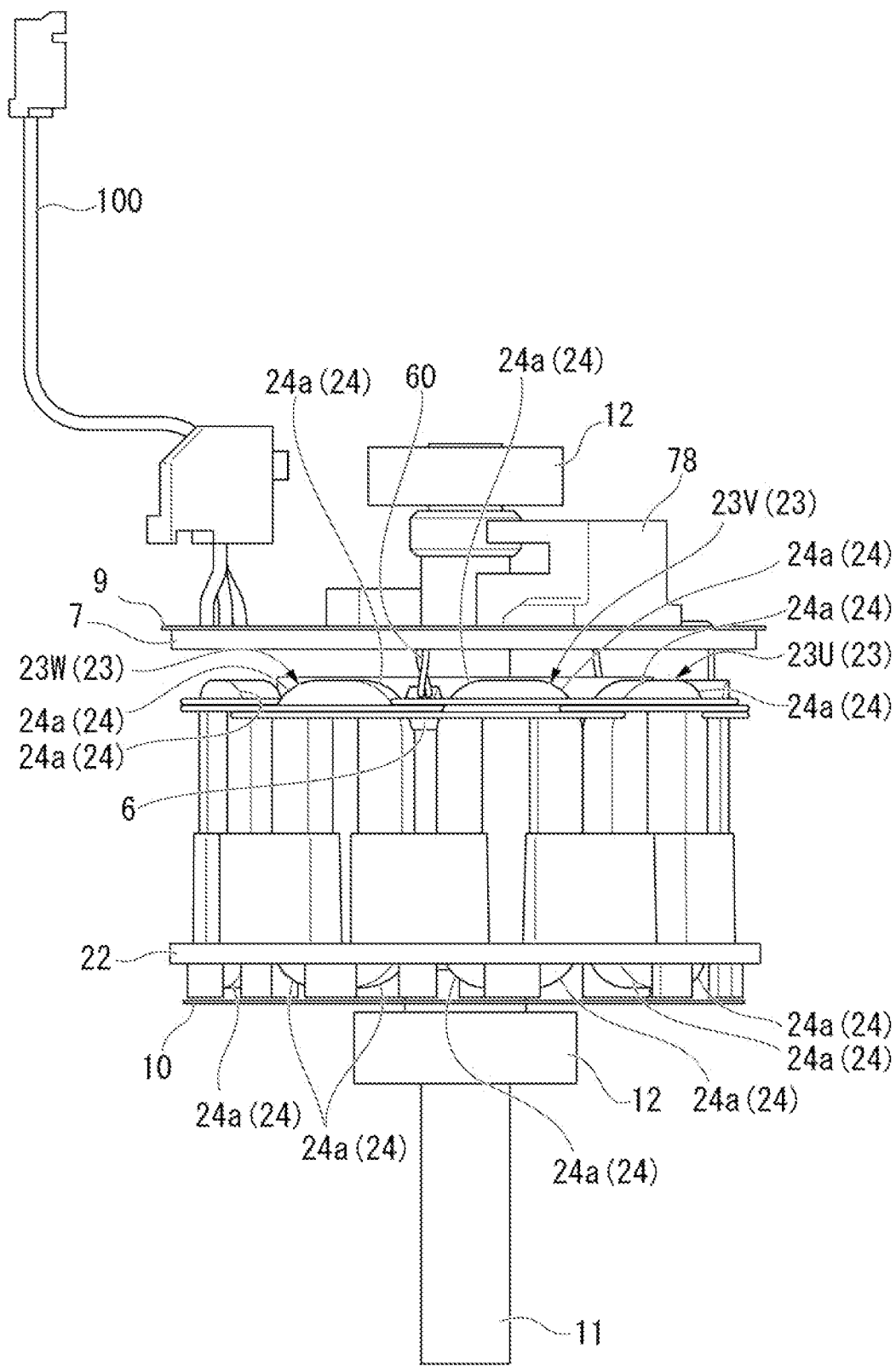
FIG. 4 is a view of the dynamo-electric machine according to the first embodiment when seen from the outside in a radial direction.

The coil 23 is formed by winding a winding wire 24 around each of the plurality of protruding portions 20b (refer to FIG. 9) with the insulators 21 and 22 therebetween. As shown in FIG. 3, the coil 23 is constituted of three sets of coils 23U, 23V, and 23W having a plurality of different phases (for example, a U phase, a V phase, and a W phase). The U-phase, V-phase, and W-phase coils 23U, 23V, and 23W are arranged in that order in the circumferential direction of the stator core 20. The coils 23 adjacent to each other in the circumferential direction are disposed with an interval therebetween. In the present embodiment, the nine coils 23 are disposed at intervals of approximately 40 degrees (the central angle) in the circumferential direction. That is, the three sets of coils 23U, 23V, and 23W are disposed at intervals of approximately 120 degrees (the central angle) in the circumferential direction. As shown in FIG. 4, each of the coils 23 has a bent portion 24a in which the winding wire 24 is bent on both end sides in the axial direction. The bent portions 24a are provided on both sides of the winding wires 24 of the coils 23, which are adjacent to each other in the circumferential direction, in the axial direction. The bent portions 24a are provided on both sides of the winding wire 24 of each of the U-phase, V-phase, and W-phase coils 23U, 23V, and 23W in the axial direction.

<Rotor>

As shown in FIG. 1, the rotor 3 is disposed in the space 91 (an internal space) of the stator 2. The rotor 3 is disposed inside the stator 2 at an interval from the stator 2 in the radial direction. The rotor 3 is fixed to the shaft 11. The rotor 3 can rotate integrally with the shaft 11 around the axis CL. The rotor 3 includes a magnet yoke 30 and a magnet 31.

For example, the magnet yoke 30 is made of a metal material such as aluminum. The magnet yoke 30 has an annular shape coaxial with the axis CL. For example, an inner peripheral surface of the magnet yoke 30 is fixed to the outer peripheral surface of the shaft 11 with an adhesive.

For example, the magnet 31 is a permanent magnet. The magnet 31 has an annular shape coaxial with the axis CL. The magnet 31 is fixed to the magnet yoke 30 by inserting the magnet yoke 30 into an insertion hole provided in the magnet 31. Thus, the magnet 31 can rotate integrally with the magnet yoke 30 and the shaft 11. The magnet 31 has a plurality of magnetic poles as N/S poles at a portion that faces the inner peripheral surface of the stator 2. The N/S poles of the plurality of magnetic poles are alternately provided in the circumferential direction.

<Case>

The case 4 has a bottomed cylindrical shape (a bottomed tubular shape) that accommodates the stator 2. The case 4 (the bottomed tubular case) has an open end 41 on one side of the case 4 in the axial direction. The case 4 has a bottom portion 42 on the other side of the case 4 in the axial direction. For example, the case 4 is made of a metal material such as aluminum.

The case 4 includes a cylindrical portion 40 (hereinafter, also referred to as a "case tubular portion 40") having a cylindrical shape that extends in the axial direction, and a bottom portion 42 connected to the other side of the case tubular portion 40 in the axial direction. The case tubular portion 40 and the bottom portion 42 are integrally formed of the same member. For example, the bottom portion 42 of the case 4 is mounted on a mounting member 101 (refer to FIG. 1) made of a metal plate material such as aluminum. The other surface of the case 4 is a mounting surface for the mounting member 101.

The bottom portion 42 of the case 4 has a communication hole in the center that communicates with one surface and the other surface. The bottom portion 42 of the case 4 has a bearing mounting portion on which the bearing 12 is mounted. A hole of the bearing 12 mounted on the bearing mounting portion and the communication hole communicate with each other.

Figure 2:
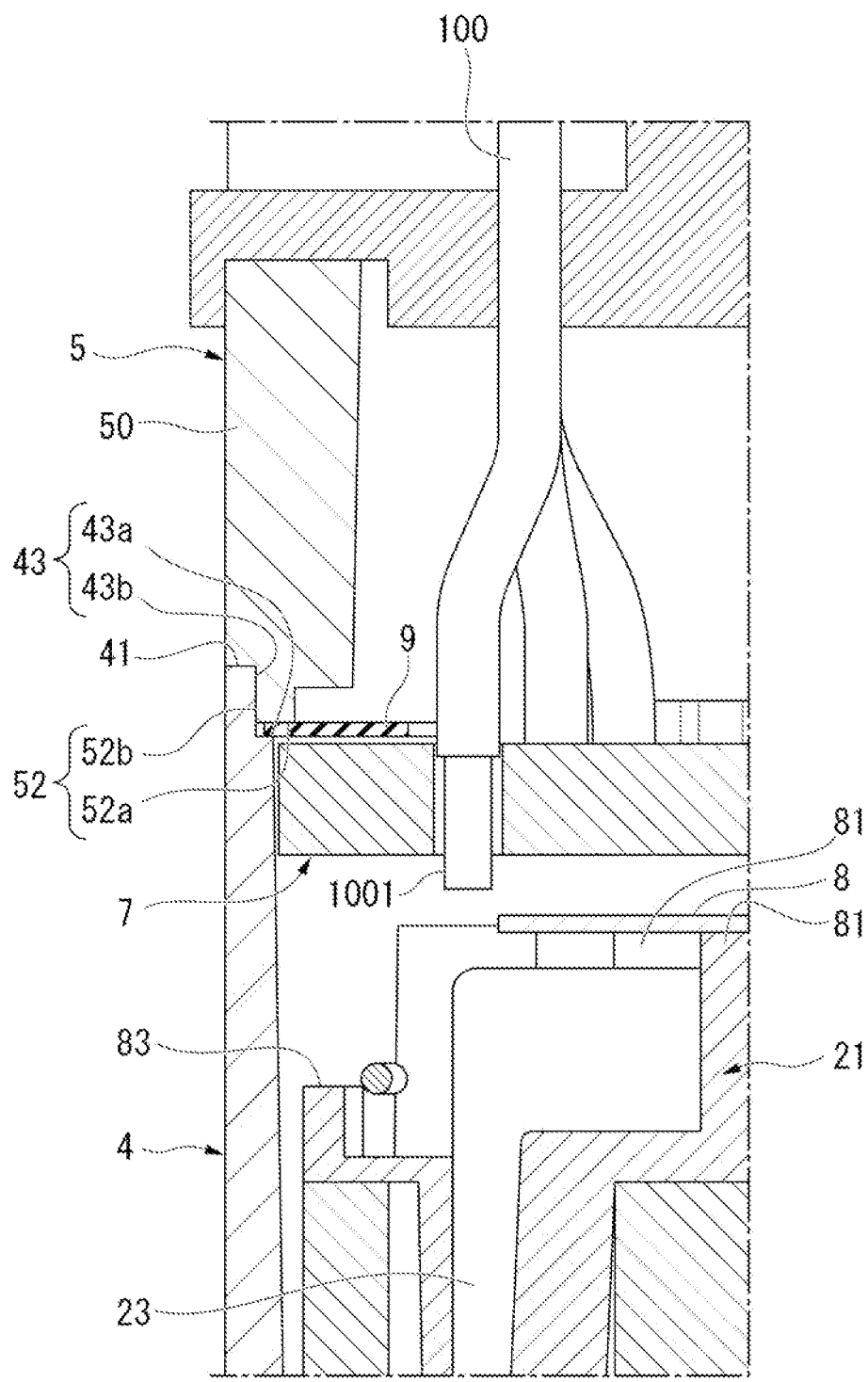
FIG. 2 is an enlarged view of an enclosed section II of FIG. 1.

As shown in FIG. 2, the case 4 has a stepped portion 43 on one side of the case tubular portion 40 in the axial direction. The stepped portion 43 has an annular surface 43a (hereinafter, also referred to as "case-side annular surface 43a") having an annular shape when seen in the axial direction, and a peripheral surface 43b (hereinafter also referred to as "case-side peripheral surface 43b") that extends from an outer peripheral edge of the case-side annular surface 43a on one side in the axial direction.

The length of the case-side peripheral surface 43b in the axial direction is larger than the length of the case-side annular surface 43a in the radial direction.

<End Cover>

As shown in FIG. 1, the end cover 5 is mounted on the open end 41 on one side of the case 4 in the axial direction. For example, the end cover 5 is made of a metal such as aluminum. The end cover 5 has a cylindrical portion 50 (hereinafter, also referred to as "cover tubular portion 50") that extends in the axial direction, and a lid portion 51 connected to one side of the cover tubular portion 50 in the axial direction. The length of the cover tubular portion 50 in the axial direction is smaller than the length of the case tubular portion 40 in the axial direction. The cover tubular portion 50 and the lid portion 51 are integrally formed of the same member. The lid portion 51 of the end cover 5 has a bearing mounting portion in which the bearing 12 is mounted in a central portion on the case 4 side.

As shown in FIG. 2, the end cover 5 has a convex portion 52 that stands upright from the other side of the cover tubular portion 50 in the axial direction to the other side thereof in the axial direction. The convex portion 52 has an annular surface 52a (hereinafter, also referred to as "cover-side annular surface 52a") having an annular shape when seen in the axial direction, and a peripheral surface 52b (hereinafter, also referred to as "cover-side peripheral surface 52b") that extends from an outer peripheral edge of the cover-side annular surface 52a to one side in the axial direction.

The length of the cover-side annular surface 52a in the radial direction is larger than the length of the case-side annular surface 43a in the radial direction.

The length of the cover-side peripheral surface 52b in the axial direction is smaller than the length of the case-side peripheral surface 43b in the axial direction.

The length of the cover-side peripheral surface 52b in the axial direction is larger than the length of the cover-side annular surface 52a in the radial direction.

The end cover 5 is mounted on the open end 41 of the case 4 on one side by fitting the convex portion 52 of the cover tubular portion 50 to the stepped portion 43 of the case tubular portion 40. The cover-side peripheral surface 52b is in contact with the case-side peripheral surface 43b. The cover-side annular surface 52a is separated from the case-side annular surface 43a in the axial direction.

<Temperature Sensor>

For example, the temperature sensor 6 is a positive temperature coefficient (PTC) thermistor. The temperature sensor 6 is provided on the end cover 5 side of the stator 2.

The temperature sensor 6 has a function of rapidly increasing a resistance value when the temperature exceeds a certain level. The temperature sensor 6 is electrically connected to each of a motor driving power supply and the circuit substrate 7 (not shown). For example, the resistance value of the temperature sensor 6 increases to stop the power supply to the circuit substrate 7 when the temperature in the vicinity of the temperature sensor 6 becomes equal to or higher than a predetermined value.

As shown in FIG. 4, the temperature sensor 6 is disposed between the bent portions 24a of the winding wires 24 in the adjacent coils 23. The temperature sensor 6 is in contact with the bent portions 24a of the winding wires 24. The temperature sensor 6 is in contact with the bent portion 24a of each of the winding wires 24 of the two coils 23 (the adjacent coils 23V and 23W in the present embodiment) adjacent to each other in the circumferential direction. In the present embodiment, only one temperature sensor 6 is provided. In the present embodiment, the temperature sensor 6 is disposed between the bent portions 24a of the winding wires 24 in the V-phase coil 23V and the W-phase coil 23W adjacent to each other in the circumferential direction.

For example, the temperature sensor 6 is brought into contact with each of the bent portions 24a of the adjacent winding wires 24 by a jig (not shown). In this state, a resin is filled in around a contact portion between the bent portion 24a of the winding wire 24 and the temperature sensor 6 by a filling device (not shown). Thus, the temperature sensor 6 can be kept in contact with the bent portion 24a of the winding wire 24.

<Circuit Substrate>

The circuit substrate 7 controls the driving of the dynamo-electric machine 1. As shown in FIG. 1, the circuit substrate 7 is disposed inside the case 4 which is inside an outer end of the case 4 in the axial direction. The circuit substrate 7 is supported by a contact portion 82 (which will be described later) which is provided to protrude upward from an upper surface of the first insulator 21. The circuit substrate 7 is disposed at a predetermined distance from the upper surface of the first insulator 21 by the support of the contact portion 82. The circuit substrate 7 is disposed between the stator 2 and the end cover 5. The circuit substrate 7 is disposed inward in the axial direction with respect to the open end 41 on one side of the case 4. The circuit substrate 7 is disposed slightly inward in the axial direction with respect to the case-side annular surface 43a (refer to FIG. 2). The circuit substrate 7 is fixed to the inner peripheral surface of the case 4.

Figure 7A:
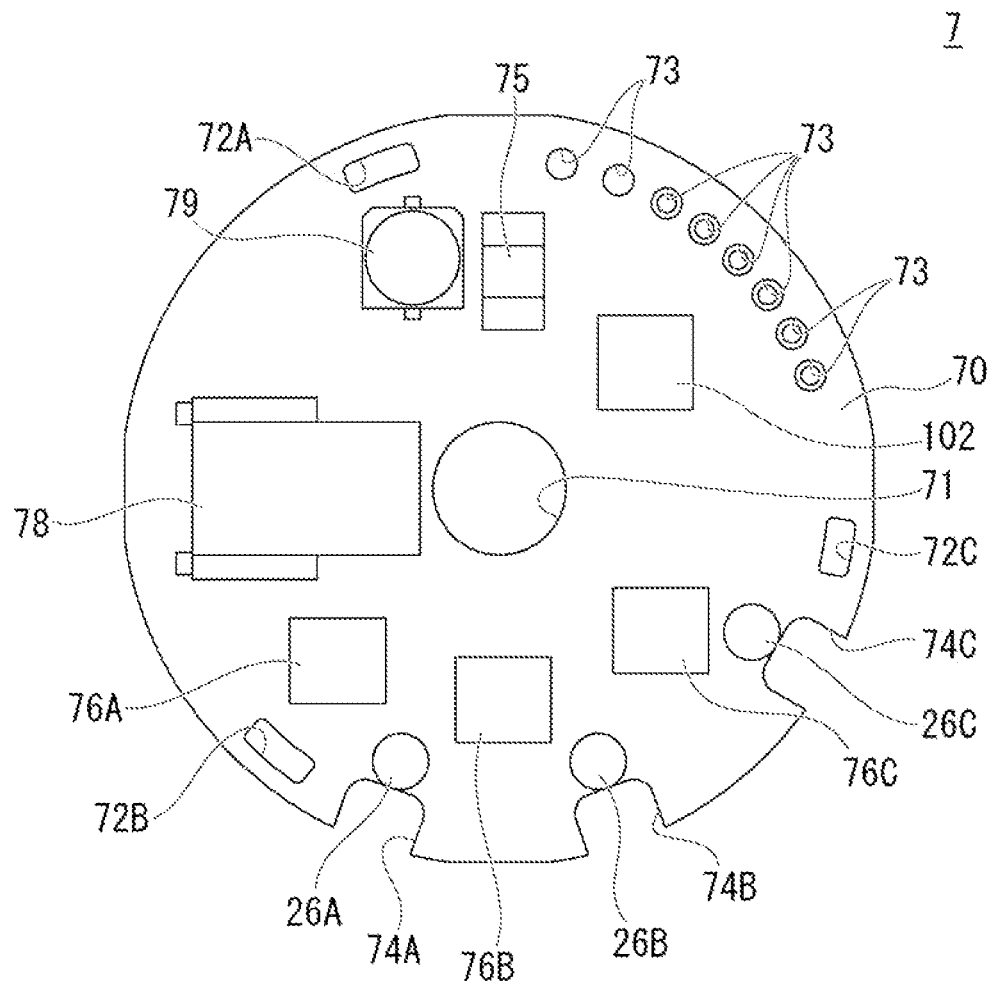
FIG. 7A is a plan view of a circuit substrate according to the first embodiment when seen from one side in the axial direction.

As shown in FIG. 7A, the circuit substrate 7 includes an annular substrate body 70 in a plan view, a resistor 75 for detecting a current supplied to the coil 23 (refer to FIG. 1), field-effect transistors (FET) 76A to 76C as switching elements, an encoder 78 for detecting a rotation angle of the shaft 11 (refer to FIG. 1), various electronic components 79, and an IC 102 for a motor controller.

The IC 102 for a motor controller generates a current in each of the U-phase, V-phase, and W-phase coils 23U, 23V, and 23W by selectively turning each of the FETs 76A to 76C on and off in a predetermined order.

Figure 7B:
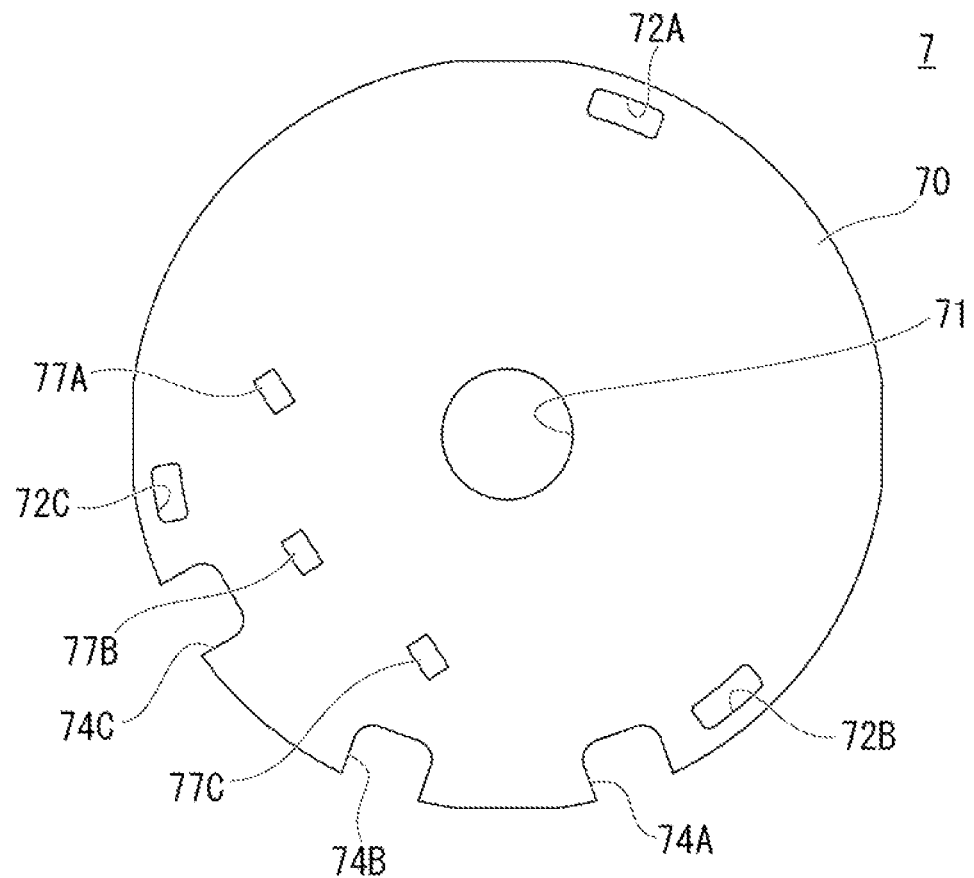
FIG. 7B is a plan view of the circuit substrate according to the first embodiment when seen from the other side in the axial direction (a plan view of a surface on the side opposite to FIG. 7A).

FIG. 7B is a plan view of an opposite surface (a back surface) of FIG. 7A in the circuit substrate 7.

As shown in FIG. 7B, the circuit substrate 7 includes magnetic sensors 77A to 77C for detecting a magnetic state (a magnitude and direction of a magnetic field) of the magnet 31.

The substrate body 70 has a shaft hole 71 coaxial with the axis CL, engaging portions 72A to 72C (substrate-side engaging portions) that engage with the first insulator 21, a connection hole 73 for electrically connecting a cable 100 (refer to FIG. 1), and cutout portions 74A to 74C for causing lead wires 25A to 25C (refer to FIG. 3) of the coil 23 to pass through.

In a plan view, the shaft hole 71 has a circular shape. The diameter of the shaft hole 71 is larger than an outer diameter of the shaft 11. The circuit substrate 7 is disposed outside the shaft 11 in the radial direction at a distance from the shaft 11 (refer to FIG. 1).

In a plan view, each of the engaging portions 72A to 72C has an elongated hole shape that extends in the circumferential direction. A plurality of (for example, three in the present embodiment) engaging portions 72A to 72C are provided at intervals in the circumferential direction. The three engaging portions 72A to 72C (a first engaging portion 72A, a second engaging portion 72B, and a third engaging portion 72C) are disposed at substantially the same interval in the circumferential direction.

In a plan view, the connection hole 73 has a circular shape. A plurality of connection holes 73 (for example, eight in the present embodiment) are provided at intervals in the circumferential direction. The eight connection holes 73 are disposed between the first engaging portion 72A and the third engaging portion 72C in the circumferential direction.

In a plan view, each of the cutout portions 74A to 74C has a concave shape that opens radially outward of the circuit substrate 7. A plurality of (for example, three in the present embodiment) cutout portions 74A to 74C are provided at intervals in the circumferential direction. The three cutout portions 74A to 74C (a first cutout portion 74A, a second cutout portion 74B and a third cutout portion 74C) are disposed between the second engaging portion 72B and the third engaging portion 72C in the circumferential direction.

For example, the resistor 75 is a shunt resistor. In the present embodiment, only one resistor 75 is provided. The resistor 75 is provided on a surface of the substrate body 70 (the circuit substrate 7) on the end cover 5 side. That is, the resistor 75 is provided on the surface of the substrate body 70 on the side opposite to the surface thereof on the stator 2 side.

A plurality of (for example, three in the present embodiment) FETs 76A to 76C are provided at intervals in the circumferential direction. The FETs 76A to 76C are provided on the surface of the substrate body 70 on the end cover 5 side. That is, the FETs 76A to 76C are provided on the surface of the substrate body 70 on the same side as the resistor 75.

The three FETs 76A to 76C (a first FET 76A, a second FET 76B and a third FET 76C) are disposed in the vicinity of the three cutout portions 74A to 74C (the first cutout portion 74A, the second cutout portion 74B and the third cutout portion 74C), respectively. Regions 26A to 26C for soldering the lead wires 25A to 25C (refer to FIG. 3) of the coil 23 are provided between the three FETs 76A to 76C and the three cutout portions 74A to 74C, respectively.

The regions 26A to 26C are disposed in the vicinity of the lead wires 25A to 25C of the coil 23. Thus, it is possible to suppress excessive elongation of the lead wires 25A to 25C of the coil 23 and to suppress generation of noise.

The FETs 76A to 76C are electrically connected to the lead wires 25A to 25C of the coil 23. For example, the lead wires 25A to 25C of the coil 23 are soldered in the regions 26A to 26C and then electrically connected to the FETs 76A to 76C by a wiring formed on the circuit substrate 7. Since the FETs 76A to 76C are disposed in the vicinity of the regions 26A to 26C, the wiring on the circuit substrate 7 can be shortened and simplified.

For example, the magnetic sensors 77A to 77C are Hall elements. A plurality of (for example, three in the present embodiment) magnetic sensors 77A to 77C are provided at intervals in the circumferential direction. The magnetic sensors 77A to 77C are provided on the surface of the substrate body 70 on the stator 2 side (the surface in FIG. 7B).

In a plan view of FIG. 7B, each of the three magnetic sensors 77A to 77C (a first magnetic sensor 77A, a second magnetic sensor 77B and a third magnetic sensor 77C) detects a change in magnetic flux due to the rotation of the magnet 31 with a magnetic sensor placed at a specific position on the substrate body 70 on the stationary side.

For example, the magnetic sensor may be directly above the magnet 31 when seen in a plan view and may be disposed close to the magnet 31 in the axial direction. Thus, rotation detection sensitivity of the magnet 31 can be improved.

For example, the encoder 78 is an optical encoder that uses an infrared light emitting diode (IR LED) as a light emitting element. For example, the encoder 78 detects rotation of a disk (a disk having a slit hole) for a detector (not shown) mounted on the shaft 11 and generates an on/off signal of light. In the present embodiment, only one encoder 78 is provided. The encoder 78 has the largest installation area among the electronic components provided on the circuit substrate 7. The encoder 78 is provided on the end cover 5 side of the substrate main body 70.

Figure 8:
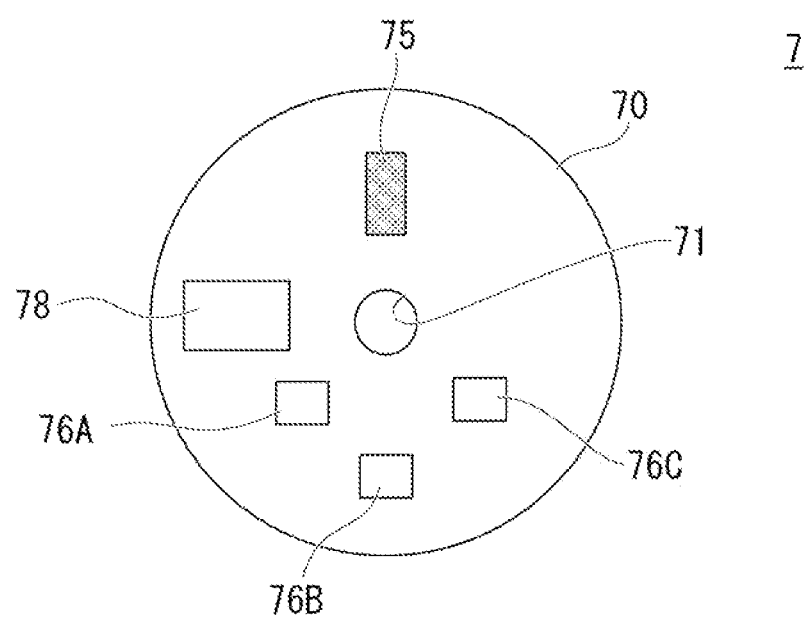
FIG. 8 is an explanatory diagram of an arrangement of a resistor and the like according to the first embodiment.

As shown in FIG. 8, in a plan view, the encoder 78 is disposed between the first FET 76A located on the leftmost side among the three FETs 76A to 76C and the resistor 75. That is, the encoder 78 is disposed between the first FET 76A and the resistor 75 in the circumferential direction. In the present embodiment, in a plan view, the resistor 75 is disposed on the side opposite to the second FET 76B with the shaft hole 71 interposed therebetween. In FIG. 8, holes other than the shaft hole 71 of the substrate body 70, cutout portions, and the like are not shown.

<First Insulation Sheet>

As shown in FIG. 1, the first insulation sheet 8 is disposed between the stator 2 and the rotor 3 and the circuit substrate 7. The first insulation sheet 8 insulates at least the circuit substrate 7 and the coil 23. The first insulation sheet 8 has an annular shape when seen in the axial direction. The first insulation sheet 8 has an inner peripheral edge portion that forms an insertion hole through which the shaft 11 is inserted in a central portion thereof. The inner peripheral edge portion of the first insulation sheet 8 is disposed outside the shaft 11 at a distance from the shaft 11 in the radial direction. Thus, the first insulation sheet 8 allows the shaft 11 to rotate. The first insulation sheet 8 is supported by the first insulator 21. Specifically, the first insulation sheet 8 is supported by a plurality of contact portions 81 (which will be described later) provided on the first insulator 21.

<Second Insulation Sheet>

The second insulation sheet 9 is disposed between the circuit substrate 7 and the end cover 5. The second insulation sheet 9 is disposed at a position adjacent to the circuit substrate 7. The second insulation sheet 9 insulates at least the circuit substrate 7 and the end cover 5. The second insulation sheet 9 has an annular shape larger than the first insulation sheet 8 when seen in the axial direction. The second insulation sheet 9 has an inner peripheral edge portion that forms an insertion hole through which the shaft 11 is inserted in a central portion thereof. The inner peripheral edge portion of the second insulation sheet 9 is disposed outside the shaft 11 at a distance from the shaft 11 in the radial direction. Thus, the second insulation sheet 9 allows the shaft 11 to rotate.

As shown in FIG. 2, the second insulation sheet 9 extends in the entire radial direction from the inner peripheral edge to the outer peripheral edge. The outer peripheral edge portion of the second insulation sheet 9 is disposed in the vicinity of the case-side peripheral surface 43b. The outer peripheral edge portion of the second insulation sheet 9 is sandwiched between an opening portion of the case 4 on one side and a tip end of the cylindrical portion 50 of the end cover 5. The second insulation sheet 9 is held by being sandwiched between the stepped portion 43 of the case tubular portion 40 and the convex portion 52 of the cover tubular portion 50. The second insulation sheet 9 comes into contact with the case-side annular surface 43a and the cover-side annular surface 52a. The second insulation sheet 9 is slightly separated from the case-side peripheral surface 43b. The second insulation sheet 9 is slightly separated from the surface of the circuit substrate 7 on the end cover 5 side in the axial direction. Additional insulation between the circuit substrate 7 and the end cover 5 is ensured by providing a gap between the surface of the circuit substrate 7 on the end cover 5 side and the second insulation sheet 9.

<Characteristics of First Insulation Sheet and Second Insulation Sheet>

Each of the first insulation sheet 8 and the second insulation sheet 9 is a sheet having both insulating properties and flame retardancy. Each of the first insulation sheet 8 and the second insulation sheet 9 is formed of aramid fibers. For example, each of the first insulation sheet 8 and the second insulation sheet 9 is an insulating paper. Each of the first insulation sheet 8 and the second insulation sheet 9 has a thickness of 0.25 mm or more. For example, each of the first insulation sheet 8 and the second insulation sheet 9 has a thickness of 0.25 mm or more and 0.35 mm or less.

For example, each of the first insulation sheet 8 and the second insulation sheet 9 has a thermal conductivity of 0.12 W/m·K or more and 0.14 W/m·K or less at a measurement temperature of 150° C. in a measuring method based on ASTM E1530.

Each of the first insulation sheet 8 and the second insulation sheet 9 has a limiting oxygen index (LOI) value higher than 20.8% in an environment of 220° C. Here, the LOI value is a numerical value used as a scale for measuring flame retardancy, and is defined by "JIS K7201 limiting oxygen index". For example, each of the first insulation sheet 8 and the second insulation sheet 9 has a LOI value of 22% or more and 25% or less in an environment of 220° C. when the thickness is 0.25 mm.

<Resin Sheet>

As shown in FIG. 1, the resin sheet 10 is disposed between the bottom portion 42 of the case 4 and the stator 2. The resin sheet 10 is disposed between the bottom portion 42 of the case 4 and the second insulator 22. The resin sheet 10 has an annular shape when seen in the axial direction. The resin sheet 10 has an inner peripheral edge portion that forms an insertion hole through which the shaft 11 is inserted in a central portion thereof. The inner peripheral edge portion of the resin sheet 10 is disposed outside the shaft 11 at intervals from the shaft 11 in the radial direction. As a result, the resin sheet 10 allows the shaft 11 to rotate.

In the present embodiment, in order to suppress misalignment of the resin sheet 10, an annular convex portion 44 having an annular shape that is in contact with an inner peripheral edge of the insertion hole of the resin sheet 10 is provided on the bottom portion 42 of the case 4. A height of the annular convex portion 44 in the axial direction is slightly larger than a thickness of the resin sheet 10. For example, an inner diameter of the insertion hole of the resin sheet 10 is designed to match an outer diameter of the annular convex portion 44.

The constitution for suppressing the misalignment of the resin sheet 10 is not limited to the providing of the annular convex portion 44. For example, instead of providing the annular convex portion 44, the outer diameter of the resin sheet 10 may be adjusted to an inner diameter of the case 4.

In the present embodiment, a position of the second insulator 22 in the axial direction is determined by coming into contact with the annular convex portion 44. Therefore, in the axial direction, the resin sheet 10 is separated from the second insulator 22. However, the present invention is not limited thereto, and the resin sheet 10 may be in contact with the second insulator 22.

The resin sheet 10 is made of silicone. The resin sheet 10 has a thickness of 0.2 mm or more. For example, the resin sheet 10 has a thickness of 0.2 mm or more and 0.3 mm or less.

For example, the resin sheet 10 has a thermal conductivity of 1.0 W/m·K or more and 1.4 W/m·K or less at a load of 20 psi in a measuring method based on ASTM D5470.

The resin sheet 10 has V-0 in the UL94 standard which is a standard indicating a degree of incombustibility of a material.

<First Insulator>

As shown in FIG. 1, the first insulator 21 has an annular portion 80 coaxial with the stator core 20, a contact portion 81 (hereinafter, also referred to as "sheet-side contact portion 81") that comes into contact with a surface of the first insulation sheet 8 on the stator 2 side, a contact portion 82 (hereinafter, also referred to as "substrate-side contact portion 82") that comes into contact with a surface of the circuit substrate 7 on the stator 2 side, a plurality of extending portions 83 (refer to FIG. 6) that extend toward the surface of the circuit substrate 7 on the stator 2 side, and engaging portions 84A to 84C (refer to FIG. 5) that engage with the circuit substrate 7 through each of the plurality of engaging portions 72A to 72C of the circuit substrate 7.

The sheet-side contact portion 81 extends from the inner peripheral side of the annular portion 80 toward one side in the axial direction. A tip end of the sheet-side contact portion 81 is in contact with the surface of the first insulation sheet 8 on the stator 2 side. A plurality of (for example, nine in the present embodiment) sheet-side contact portions 81 are provided at intervals in the circumferential direction (refer to FIG. 6). The nine sheet-side contact portions 81 are disposed at substantially the same interval in the circumferential direction (refer to FIG. 6).

The substrate-side contact portion 82 extends from the outer peripheral side of the annular portion 80 toward one side in the axial direction. A tip end of the substrate-side contact portion 82 is in contact with the surface of the circuit substrate 7 on the stator 2 side. The substrate-side contact portion 82 extends toward one side in the axial direction longer than each of the sheet-side contact portion 81 and the extending portion 83 (refer to FIG. 6). A plurality of (for example, eleven in the present embodiment) substrate-side contact portions 82 are provided at intervals in the circumferential direction (refer to FIG. 6).

Figure 6:
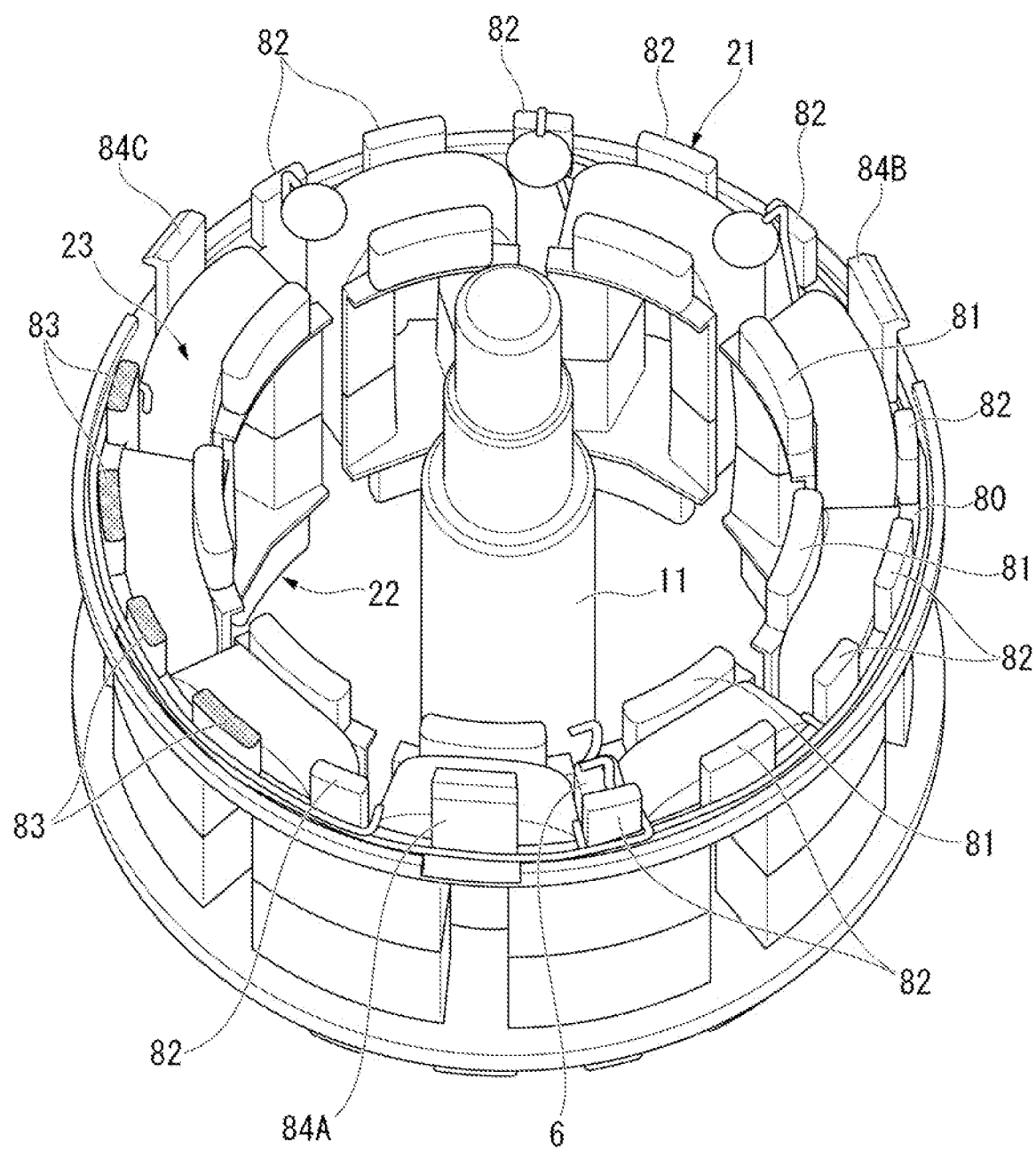
FIG. 6 is a perspective view of the dynamo-electric machine according to the first embodiment when seen from the first insulator side.

As shown in FIG. 6, the extending portion 83 extends from the outer peripheral side of the annular portion 80 toward one side in the axial direction. A plurality of (for example, four in the present embodiment) extending portions 83 are provided at intervals in the circumferential direction. A tip end of the extending portion 83 is separated from the surface of the circuit substrate 7 on the stator 2 side. That is, the extending portion 83 is not in contact with the circuit substrate 7. A gap is formed between the tip end of the extending portion 83 and the surface of the circuit substrate 7 on the stator 2 side. The gap between the tip end of the extending portion 83 and the circuit substrate 7 is a gap for a space in which a wiring part 1001 is accommodated when the wiring part 1001 (refer to FIG. 2) of the cable 100 is electrically connected to the circuit substrate 7. The gap serves as a clearance for the protruding wiring part 1001 as described below. Specifically, the wiring part 1001 is soldered to the circuit substrate 7 in a state in which the wiring part 1001 is inserted through the connection hole 73. Then, the wiring part 1001 and the solder protrude from the surface of the circuit substrate 7 on the stator 2 side to the stator 2 side. A gap is provided as the clearance for the protruding wiring part 1001.

As shown in FIG. 6, the engaging portions 84A to 84C (insulator-side engaging portions) extend from the outer peripheral side of the annular portion 80 to one side in the axial direction. The engaging portions 84A to 84C extend to one side in the axial direction to be longer than the substrate-side contact portion 82. Each of the engaging portions 84A to 84C has a hook shape that can be engaged with the circuit substrate 7 (refer to FIG. 5). The engaging portions 84A to 84C extend from the annular portion 80 to one side in the axial direction and are then bent outward in the radial direction. Thus, the engaging portions 84A to 84C make it possible to maintain an engaged state with the circuit substrate 7.

A plurality of (for example, three in the present embodiment) engaging portions 84A to 84C are provided at intervals in the circumferential direction. The three engaging portions 84A to 84C (a first engaging portion 84A, a second engaging portion 84B, and a third engaging portion 84C) are disposed at substantially the same interval in the circumferential direction. The three engaging portions 84A to 84C (the first engaging portion 84A, the second engaging portion 84B, and the third engaging portion 84C) engage with the circuit substrate 7 through the three engaging portions 72A to 72C (the first engaging portion 72A, the second engaging portion 72B, and the third engaging portion 72C), respectively (refer to FIG. 5).

The eleven substrate-side contact portions 82 include five substrate-side contact portions 82 disposed between the first engaging portion 84A and the second engaging portion 84B in the circumferential direction, five substrate-side contact portions 82 disposed between the second engaging portion 84B and the third engaging portion 84C in the circumferential direction, and one substrate-side contact portion 82 disposed between the first engaging portion 84A and the third engaging portion 84C in the circumferential direction.

The four extending portions 83 are disposed between the first engaging portion 84A and the third engaging portion 84C in the circumferential direction.

<Resin Filling Structure in Case>

Figure 10:
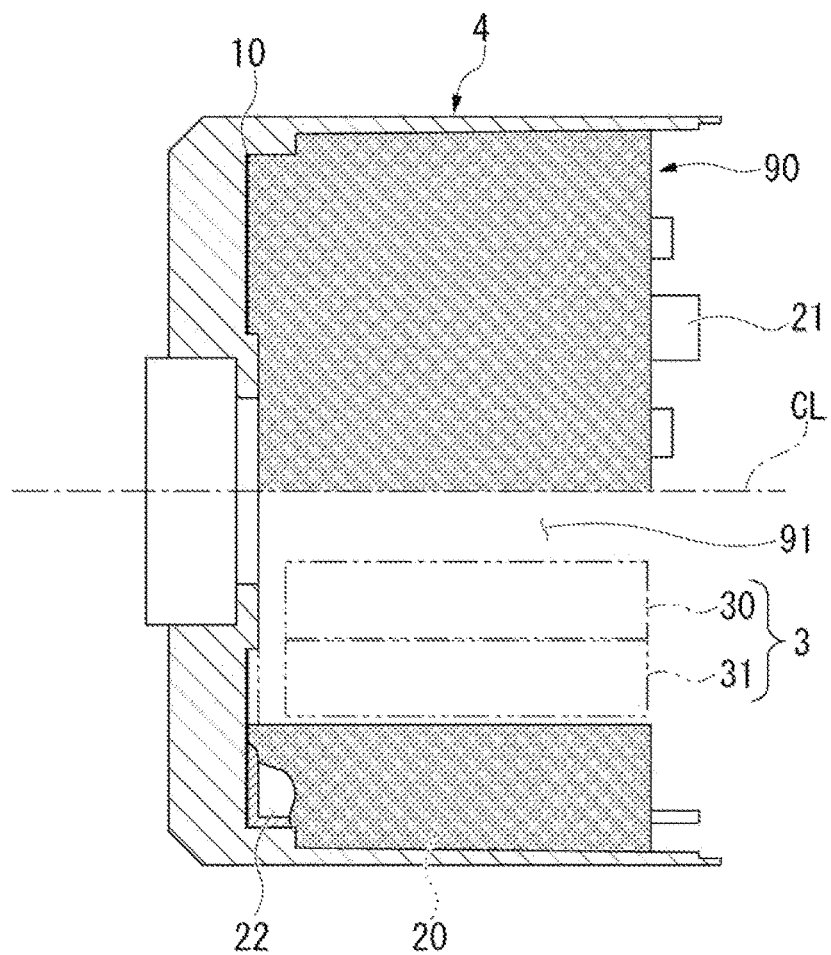
FIG. 10 is an explanatory diagram of a resin filling structure in a case according to the first embodiment.

As shown in FIG. 10, the gap between the case 4 and the insulators 21 and 22 (the first insulator 21 and the second insulator 22) is filled with a resin 90. Thus, the gap between the case 4 and the insulators 21 and 22 is filled with the resin 90. The gaps between the plurality of protruding portions 20b (refer to FIG. 9) in the stator core 20 are filled with the resin 90. Thus, the gaps between the plurality of protruding portions 20b in the stator core 20 are filled with the resin 90. The case 4, the stator 2, and the temperature sensor 6 (refer to FIG. 4) are integrated by the resin 90.

For example, a filling step of filling the case 4 with the resin 90 is performed by the following procedure.

For example, the temperature sensor 6 is brought into contact with the bent portion 24a of the coil 23 using a jig (not shown), and the lead wire 60 of the temperature sensor 6 is exposed to the outside. Then, in this state, the case 4 is filled with the resin 90 (refer to FIG. 4). Thus, the case 4, the stator 2, and the temperature sensor 6 are integrated with the resin 90. Then, the lead wire 60 passes through a slit (not shown) of the circuit substrate 7 and is soldered to the circuit substrate 7. In this way, a wiring step of connecting the lead wire 60 to the circuit substrate 7 is performed.

The resin 90 fills the other gaps in the case 4 in a state in which a space 91 in which the shaft 11 and the rotor 3 are inserted is left in the central portion. For example, the resin 90 is a thermosetting resin such as an epoxy resin. The resin 90 is filled in the case 4 to a position at which the coil 23 (refer to FIG. 1) is not exposed in the axial direction.

For example, the resin 90 has a thermal conductivity of 0.1 W/m·K or more and 0.9 W/m·K or less at a load of 20 psi in a measuring method based on ASTM D5470. The resin 90 has V-0 in UL94 standard which is a standard indicating a degree of incombustibility of the material. In the resin 90, a low volume efficiency in an environment of 25° C. is $1\times10^{15}$ Ω·cm, a volume low efficiency in an environment of 100° C. is $1\times10^{15}$ Ω·cm, and a volume low efficiency in an environment of 150° C. is $3\times10^{13}$ Ω·cm in a measuring method based on ASTM D257.

For example, a method of manufacturing the stator unit in which the stator 2 is mounted in the case 4 and the case 4 is filled with the resin 90 is performed by the following procedure (step).

First, the resin sheet 10 is placed in the case 4 (a sheet arrangement step).

Next, the stator 2 is placed in the case 4 (a stator arrangement step).

Next, a cylindrical mold material having substantially the same size as the rotor 3 is placed in the case 4 (a first filling preparation step). For example, the mold material has a cylindrical shape having a size so that the plurality of protruding end portions 20c forming the space 91 and the outer peripheral surface of the rotor 3 come into contact therewith. The mold material is, for example, a sheet of polytetrafluoroethylene (PTFE).

Next, the temperature sensor 6 is disposed between the bent portions 24a of the adjacent coils 23 using a jig (not shown) in a state in which the temperature sensor 6 is in contact with the bent portions 24a of the adjacent coils 23 (a second filling preparation step).

Next, the resin 90 is filled between an inner peripheral surface of the case 4 and an outer peripheral surface of the mold material using a filling device (not shown) (a resin filling step).

Next, the case 4 filled with the resin 90 is placed in a vacuum chamber and then evacuated to remove (degas) air bubbles contained in the filled resin 90 (a filling finish step).

Next, the mold material is taken out (a filling completion step). As a result, the space 91 in which the rotor 3 is inserted is formed in the case 4 filled with the resin 90.

<Operation and Effect>

As described above, the dynamo-electric machine 1 according to the above-described embodiment includes the tubular stator 2, the rotor 3 disposed in the internal space of the stator 2, the bottomed tubular case 4 that accommodates the stator 2, the end cover 5 mounted on the open end 41 of the case 4 on one side, and the temperature sensor 6, wherein the stator 2 includes the stator core 20 having the plurality of protruding portions 20b that protrude toward the center of the stator 2, the insulators 21 and 22 mounted on the stator core 20, and the coil 23 formed by winding the winding wire 24 around each of the plurality of protruding portions 20b with the insulators 21 and 22 therebetween, and the temperature sensor 6 is disposed on the end cover 5 side of the stator 2 between the bent portions 24a of the winding wires 24 in the adjacent coils 23.

With such a constitution, since the temperature sensor 6 is disposed on the end cover 5 side of the stator 2 between the bent portions 24a of the winding wires 24 in the adjacent coils 23, it is possible to detect the temperature of the bent portion 24a which is most likely to generate heat in the dynamo-electric machine 1. For example, the driving of the dynamo-electric machine 1 can be optimally operated based on detection results of the temperature sensor 6 (the temperature of the bent portion 24a of the winding wire 24 in the coil 23 of the dynamo-electric machine 1). Therefore, it is possible to suppress problems due to the heat generation of the dynamo-electric machine 1 using the temperature sensor 6.

In the above-described embodiment, the temperature of the bent portion 24a of the winding wire 24 can be directly detected by bringing the temperature sensor 6 into contact with the bent portion 24a of the winding wire 24. Therefore, the temperature of the bent portion 24a which is most likely to generate heat in the dynamo-electric machine 1 can be detected with higher accuracy.

In the above-described embodiment, the circuit substrate 7 that controls driving of the dynamo-electric machine 1 is further provided. The circuit substrate 7 is disposed in the case 4 and is disposed between the stator 2 and the end cover 5, and thus the following effects can be obtained.

As compared with a case in which the circuit substrate 7 is disposed outside the case 4 (inside the end cover 5), the circuit substrate 7 can be easily assembled. Therefore, the dynamo-electric machine 1 can be assembled efficiently.

In the above-described embodiment, the first insulator 21 has the following effects by having the substrate-side contact portion 82 that comes into contact with the surface of the circuit substrate 7 on the stator 2 side.

The circuit substrate 7 can be separated from the coil 23 and supported at a predetermined position in the axial direction by the substrate-side contact portion 82. Specifically, the circuit substrate 7 can be separated from the coil 23, which is a heat generation source, at a predetermined interval by arranging the circuit substrate 7 apart from the coil 23 due to the substrate-side contact portion 82. Further, the magnet 31 of the rotor 3 can be set at a position that can be optimally detected by the three magnetic sensors 77A to 77C.

In the above-described embodiment, the circuit substrate 7 has the plurality of engaging portions 72A to 72C disposed at predetermined intervals in the circumferential direction. The first insulator 21 has the engaging portions 84A to 84C corresponding to each of the plurality of engaging portions 72A to 72C. The following effects are obtained by engaging the circuit substrate 7 and the first insulator 21 with each other in a state in which the engaging portions 84A to 84C of the first insulator 21 are inserted into the plurality of engaging portions 72A to 72C of the circuit substrate 7.

Due to the plurality of engaging portions 84A to 84C, the circuit substrate 7 can be held while positions of the circuit substrate 7 in the circumferential direction and the radial direction are defined.

In the above-described embodiment, the following effects are obtained by filling the gaps between the case 4 and the insulators 21 and 22 of the stator 2 disposed in the case 4 and between the plurality of protruding portions 20b in the stator core 20 with the resin 90 and integrating the case 4, the stator 2, and the temperature sensor 6.

Since the thermal conductivity of the heat generated from the coil 23 of the stator 2 is improved and the generated heat is released from the entire case 4 by the resin 90 filled in the gap in the case 4, it is possible to suppress the temperature rise of the dynamo-electric machine 1 (the temperature rise of the coil 23). In addition, the contact state of the temperature sensor 6 with respect to the coil 23 of the stator 2 is maintained, and thus the temperature detection accuracy is improved. Therefore, it is possible to more effectively suppress the troubles caused by the heat generation of the dynamo-electric machine 1 (the coil 23) using the temperature sensor 6.

In the above-described embodiment, the case 4 is a bottomed tubular case having the bottom portion 42 on the other side and further includes the resin sheet 10 disposed between the bottom portion 42 and the stator 2, thereby obtaining the following effects.

Since the resin sheet 10 having a higher thermal conductivity than the resin is disposed between the bottom portion 42 of the case 4 and the stator 2, when the bottom portion 42 of the case 4 is mounted on the mounting member 101, it is possible to promote heat conduction (heat dissipation) of heat generated from the coil 23 to the mounting member 101 and to suppress the temperature rise of the dynamo-electric machine 1 (the coil 23). Further, due to the resin sheet 10, it is possible to ensure the insulating property between the bottom portion 42 of the case 4 and the stator 2 disposed in the case 4.

In the above-described embodiment, since the circuit substrate 7 has the resistor 75 for detecting a current supplied to the coil 23, and the resistor 75 is disposed on the surface of the circuit substrate 7 on the end cover 5 side, the following effects are obtained.

The resistor 75 can be separated from the coil 23, and the influence of heat on the resistor 75 can be suppressed by interposing the circuit substrate 7 between the coil 23 and the resistor 75 which are heat generation sources. Therefore, it is possible to suppress a decrease in the detection accuracy of the current supplied to the coil 23.

In the above-described embodiment, since the circuit substrate 7 further includes the plurality of FETs 76A to 76C and the encoder 78, and the encoder 78 is disposed between the first FET 76A located on the leftmost side among the plurality of FETs 76A to 76C and the resistor 75 in a plan view, the following effects are obtained.

Since a plurality of electronic components are mounted on the surface of the circuit substrate 7 on the end cover 5 side, although a space for arranging each of the electronic components is limited, the resistor 75, the encoder 78, and the plurality of FETs 76A to 76C can be suitably disposed in the limited space of the circuit substrate 7.

In the above-described embodiment, since the first insulation sheet 8 that insulates the circuit substrate 7 and the coil 23 is disposed between the circuit substrate 7 and the stator 2, and the second insulation sheet 9 that insulates the circuit substrate 7 and the end cover 5 is disposed between the circuit substrate 7 and the end cover 5, the dynamo-electric machine 1 obtains the following effects.

Since the circuit substrate 7 and the coil 23 are insulated and isolated by the first insulation sheet 8, and the circuit substrate 7 and the end cover 5 are insulated by the second insulation sheet 9, even when the circuit substrate 7, the coil 23, the circuit substrate 7 and the end cover 5 are disposed close to each other, the insulating property can be ensured, and the safety can be improved. In addition, due to each of the first insulation sheet 8 and the second insulation sheet 9 being adopted as the insulating property in the axial direction, the thickness in the axial direction can be smaller than a case in which a sealing resin (a mold resin) is used as the insulating material, the dynamo-electric machine 1 can be miniaturized in the axial direction.

Further, since the resin 90 is filled in the gap between the case 4 and the stator 2 arranged in the case 4, insulation is ensured by covering the coil 23 of the stator 2 with the resin 90, and further insulation can be ensured by the first insulation sheet 8. Also, since the circuit substrate 7 and the end cover 5 are insulated by the second insulation sheet 9, the end cover 5 made of a metal material can be used, and it is possible to realize electromagnetic compatibility (EMC) and to enhance a heat dissipation effect.

In the above-described embodiment, since each of the first insulation sheet 8 and the second insulation sheet 9 has the LOI value higher than 20.8% in the environment of 220° C., the following effects are obtained.

A material having the LOI value higher than 20.8% in the environment of 220° C. has heat resistance and flame retardancy, and for example, even when the ambient temperature of the coil 23 rises to 200° C., there is almost no effect on electrical and mechanical properties. Thus, even under high temperature use, the insulating properties between the circuit substrate 7 and the coil 23 and between the circuit substrate 7 and the end cover 5 can be ensured, and the safety can be further improved.

In the above-described embodiment, the first insulator 21 has the following effects by having the sheet-side contact portion 81 that comes into contact with the surface of the first insulation sheet 8 on the stator 2 side.

The first insulation sheet 8 can be supported in the axial direction by the sheet-side contact portion 81.

In the above-described embodiment, the second insulation sheet 9 has the following effects by being sandwiched between the opening portion of the case 4 on one side and the tip end of the cylindrical portion 50 of the end cover 5.

The second insulation sheet 9 can be held by the opening portion of the case 4 on one side and the tip end of the cylindrical portion 50 of the end cover 5, and the second insulation sheet 9 can be positioned at a predetermined position in the axial direction.

In the above-described embodiment, since each of the first insulation sheet 8 and the second insulation sheet 9 is formed of aramid fibers and has a thickness of 0.25 mm or more, the following effects are obtained.

In each of the first insulation sheet 8 and the second insulation sheet 9, excellent withstand voltage characteristics (for example, a withstand voltage of 5000 V in UL standard) can be obtained.

In the above-described embodiment, since the circuit substrate 7 includes the magnetic sensors 77A to 77C, and the magnetic sensors 77A to 77C are provided on the surface of the circuit substrate 7 on the stator 2 side, the following effects can be obtained.

Since the magnetic sensors 77A to 77C can be brought closer to the rotor 3 as compared with a case in which the magnetic sensors 77A to 77C are provided on the end cover 5 side of the circuit board 7, the detection accuracy of the magnetic sensors 77A to 77C can be improved. In addition, when the first insulation sheet 8 is provided between the circuit substrate 7 and the stator 2, the first insulation sheet 8 can insulate the coil 23 from the magnetic sensors 77A to 77C.

Second Embodiment

Figure 11:
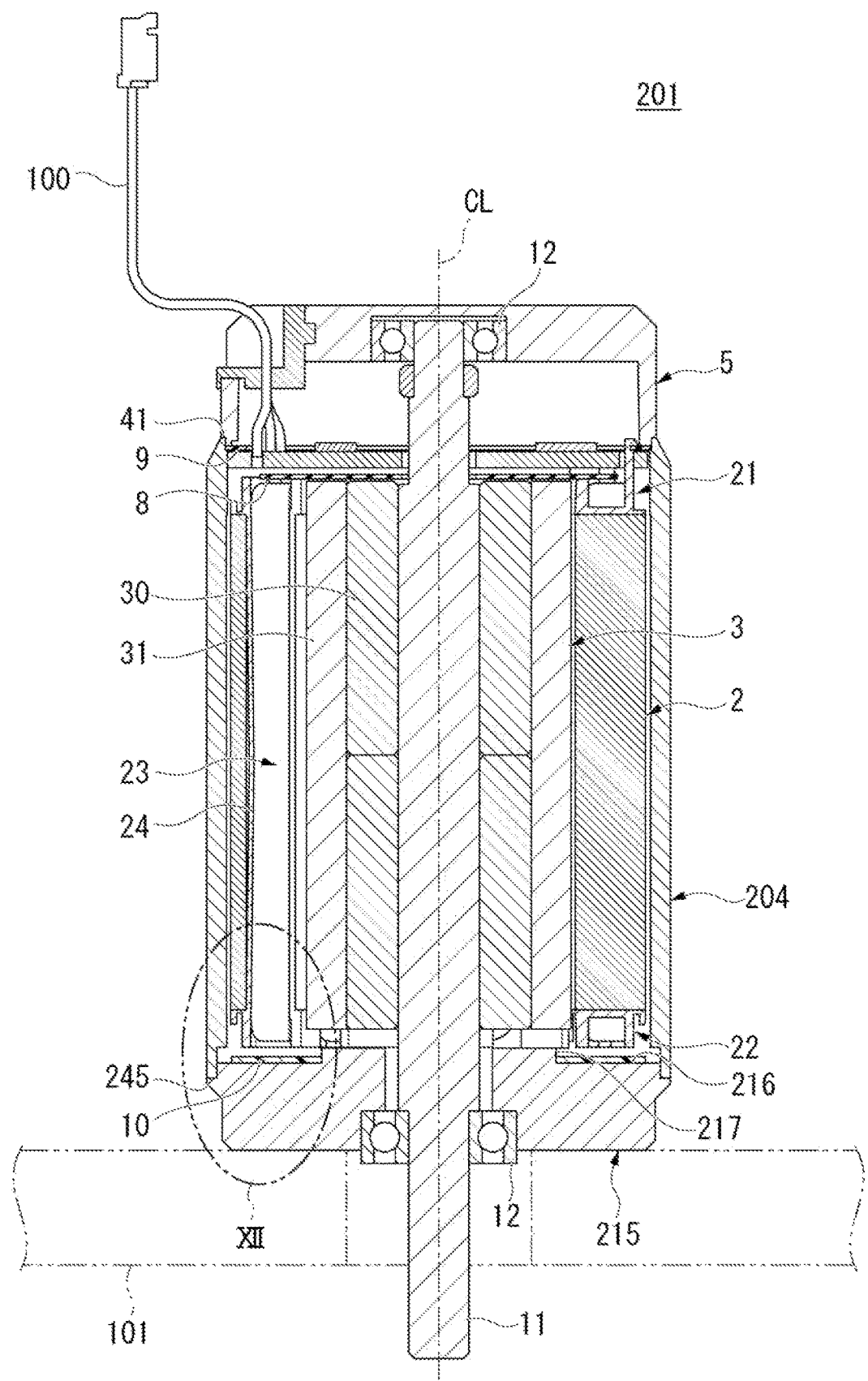
FIG. 11 is a diagram corresponding to FIG. 1 showing a cross section of a dynamo-electric machine according to a second embodiment.

In the above-described first embodiment, although an example in which the case 4 is the bottomed tubular case having the bottom portion 42 on the other side has been described, but the present invention is not limited thereto. For example, as shown in FIG. 11, a case 204 may be a tubular case having a tubular shape. In FIG. 11, the same constitutions as those in the first embodiment are designated by the same reference numerals, and a detailed description thereof will be omitted.

As shown in FIG. 11, a dynamo-electric machine 201 includes a tubular case 204, a front cover 215 mounted on an open end 245 of the tubular case 204 on the other side, and a resin sheet 10 disposed between the front cover 215 and the stator 2.

Figure 12:
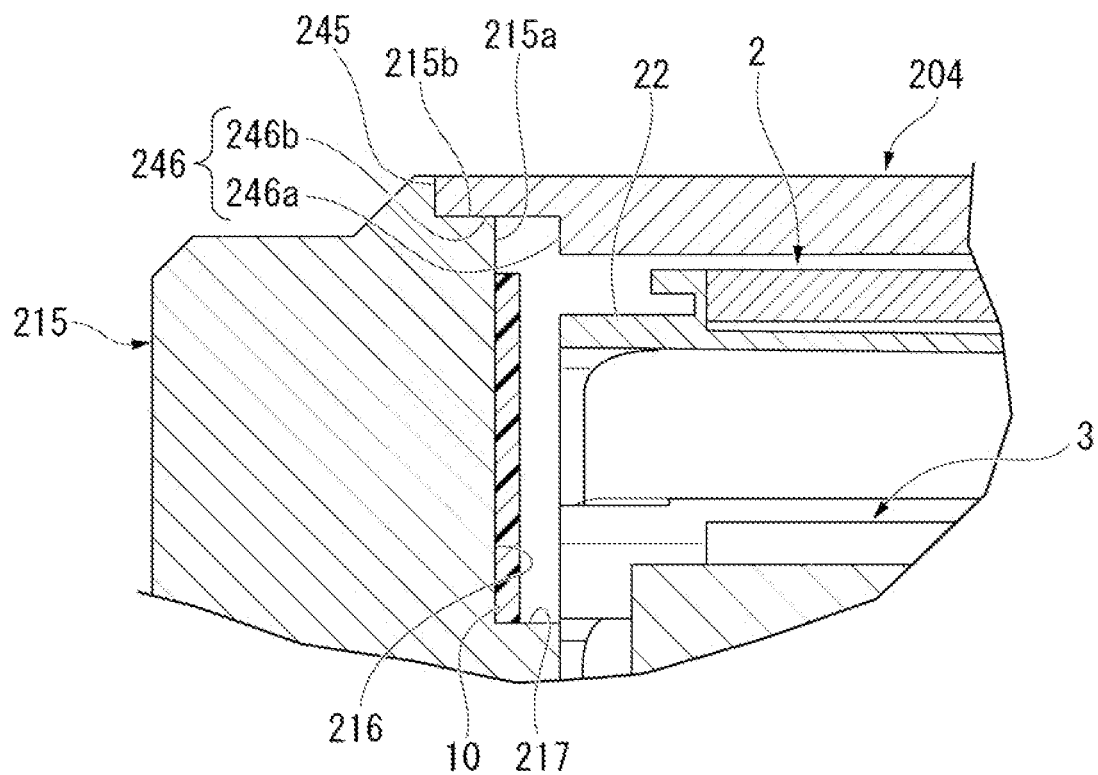
FIG. 12 is an enlarged view of an enclosed section XII of FIG. 11.

The tubular case 204 has a larger length in the axial direction than the bottomed tubular case 4 (refer to FIG. 1) of the first embodiment. As shown in FIG. 12, the tubular case 204 has a second stepped portion 246 at a portion on the other side in the axial direction. The second stepped portion 246 has an annular surface 246a (hereinafter, also referred to as "second case-side annular surface 246a") having an annular shape when seen in the axial direction, and a peripheral surface 246b (hereinafter, also referred to as "second case-side peripheral surface 246b") that extends from an outer peripheral edge of the second case-side annular surface 246a to the other side in the axial direction. A length of the second case-side peripheral surface 246b in the axial direction is larger than a length of the second case-side annular surface 246a in the radial direction.

For example, a portion of the front cover 215 on the other side is mounted on a mounting member 101 made of a metal plate material such as aluminum. The other surface of the front cover 215 is a mounting surface for the mounting member 101.

The front cover 215 is mounted on the open end 245 of the tubular case 204 on the other side in the axial direction. For example, the front cover 215 is made of a metal material such as aluminum. The front cover 215 has an annular surface 215a (hereinafter, also referred to as "front cover-side annular surface 215a") having an annular shape when seen in the axial direction, and a peripheral surface 215b (hereinafter, also referred to as "front cover-side peripheral surface 215b") that extends from an outer peripheral edge of the front cover-side annular surface 215a to the other side in the axial direction.

A length of the front cover-side annular surface 215a in the radial direction is larger than a length of the second case-side annular surface 246a in the radial direction.

A length of the front cover-side peripheral surface 215b in the axial direction is smaller than a length of the second case-side peripheral surface 246b in the axial direction.

A length of the front cover-side peripheral surface 215b in the axial direction is smaller than a length of the front cover-side annular surface 215a in the radial direction.

The front cover 215 is mounted on the open end 245 on the other side of the tubular case 204 by fitting an outer peripheral portion of the front cover 215 on one side in the axial direction to the second stepped portion 246 of the tubular case 204. The front cover-side peripheral surface 215b is in contact with the second case-side peripheral surface 246b. The front cover-side annular surface 215a is separated from the second case-side annular surface 246a in the axial direction.

The resin sheet 10 is disposed between the front cover 215 and the stator 2. The resin sheet 10 is disposed between the front cover 215 and the second insulator 22. In the second embodiment, in order to suppress the misalignment of the resin sheet 10, an annular convex portion 217 that has an annular shape and is in contact with an inner peripheral edge of the insertion hole of the resin sheet 10 is provided on the bottom portion 216 of the front cover 215. A height of the annular convex portion 217 in the axial direction is slightly larger than a thickness of the resin sheet 10. For example, an inner diameter of the insertion hole of the resin sheet 10 is designed to match an outer diameter of the annular convex portion 217.

The constitution for suppressing the misalignment of the resin sheet 10 is not limited to the providing of the annular convex portion 217. For example, instead of providing the annular convex portion 217, the outer diameter of the resin sheet 10 may be adjusted to the inner diameter of the tubular case 204.

In the second embodiment, a position of the second insulator 22 in the axial direction is determined by the second insulator 22 coming into contact with the annular convex portion 217. Therefore, in the axial direction, the resin sheet 10 is separated from the second insulator 22.

However, the present invention is not limited thereto, and the resin sheet 10 may be in contact with the second insulator 22.

In the second embodiment, since the case 204 is the tubular case having a tubular shape and includes the front cover 215 mounted on the open end 245 of the tubular case 204 on the other side, and the resin sheet 10 disposed between the front cover 215 and the stator 2, the following effects are obtained.

When the front cover 215 is mounted on the mounting member 101 by arranging the resin sheet 10 having a higher thermal conductivity than the resin between the front cover 215 and the stator 2, it is possible to promote heat conduction (heat dissipation) of heat generated from the coil 23 to the mounting member 101 and to suppress the temperature rise of the dynamo-electric machine 201 (the coil 23). Further, the insulating property between the front cover 215 and the stator 2 disposed in the case 204 can be ensured by the resin sheet 10.

Modified Examples

The technical scope of the present invention is not limited to the above-described embodiments, and various modifications can be made without departing from the spirit of the present invention.

For example, in the above-described first embodiment, in a plan view, the example in which the encoder 78 is disposed between the first FET 76A located on the leftmost side among the plurality of FETs 76A to 76C and the resistor 75 has been described, but the present invention is not limited thereto.

Figure 13:
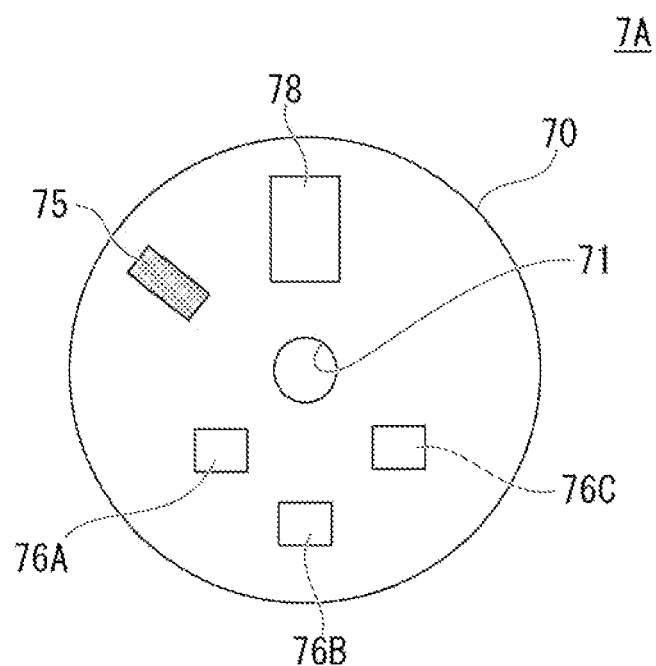
FIG. 13 is a diagram corresponding to FIG. 8 showing an arrangement of a resistor and the like according to a first modification.

For example, as shown in FIG. 13, in a plan view of the circuit substrate 7A, the resistor 75 may be disposed between the first FET 76A located on the leftmost side among the plurality of FETs 76A to 76C and the encoder 78. That is, the resistor 75 is disposed between the first FET 76A and the encoder 78 in the circumferential direction. In the present modified example, in a plan view, the resistor 75 is disposed on the side opposite to the third FET 76C with the shaft hole 71 interposed therebetween. In the present modified example, the encoder 78 is disposed on the side opposite to the second FET 76B with the shaft hole 71 interposed therebetween in a plan view.

In the present modified example, in a plan view, the resistor 75 is disposed between the first FET 76A located on the leftmost side among the plurality of FETs 76A to 76C and the encoder 78, and thus the following effects are obtained.

Since a plurality of electronic components are mounted on the surface of the circuit substrate 7A on the end cover 5 side, the space for arranging each of the electronic components is limited, and the resistor 75, the encoder 78, and the plurality of FETs 76A to 76C can be suitably disposed in the limited space of the circuit substrate 7A.

In the above-described first embodiment, in a plan view, although the example in which the resistor 75 is disposed on the side opposite to the second FET 76B with the shaft hole 71 interposed therebetween has been described, the present invention is not limited thereto.

Figure 14:
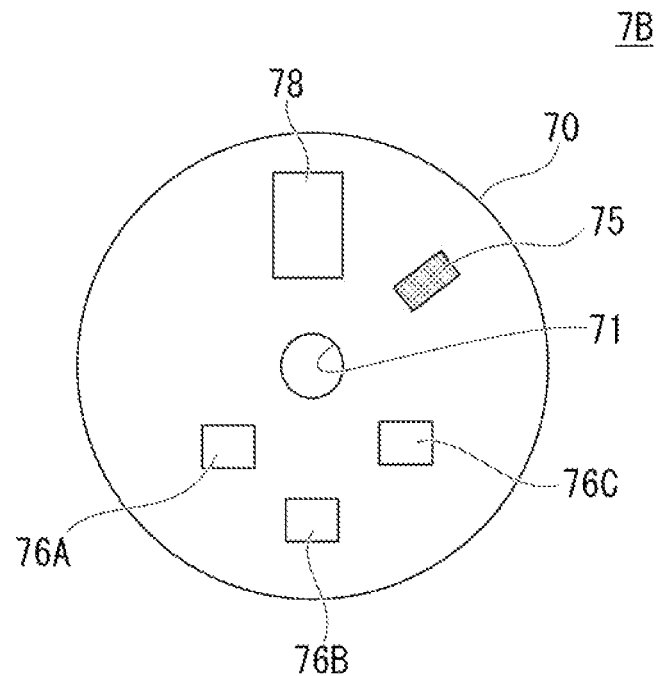
FIG. 14 is a diagram corresponding to FIG. 8, showing an arrangement of a resistor and the like according to a second modification.

For example, as shown in FIG. 14, in a plan view of the circuit substrate 7B, the resistor 75 may be disposed on the side opposite to the first FET 76A with the shaft hole 71 interposed therebetween. In the present modified example, the encoder 78 is disposed on the side opposite to the second FET 76B with the shaft hole 71 interposed therebetween in a plan view.

In the example of FIG. 13, in a plan view, although the example in which the resistor 75 is disposed on the side opposite to the third FET 76C with the shaft hole 71 interposed therebetween has been described, the present invention is not limited thereto.

Figure 15:
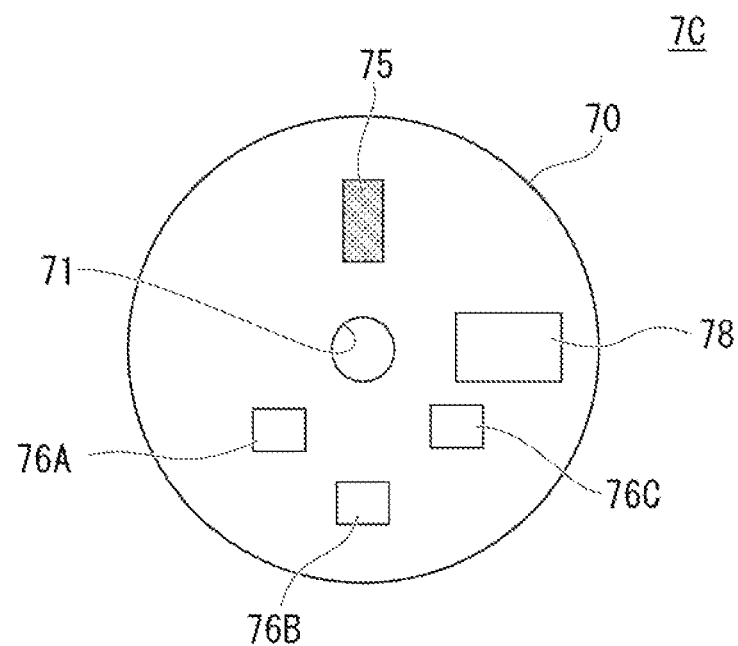
FIG. 15 is a diagram corresponding to FIG. 8, showing an arrangement of a resistor and the like according to a third modification.

For example, as shown in FIG. 15, in a plan view of the circuit substrate 7C, the resistor 75 may be disposed on the side opposite to the second FET 76B with the shaft hole 71 interposed therebetween. In the present modified example, the encoder 78 is disposed in the vicinity of the third FET 76C in a plan view.

In the above-described embodiment, although the example in which the temperature sensor 6 is in contact with the bent portion 24*a* of the winding wire 24 has been described, the present invention is not limited thereto. For example, the temperature sensor 6 may be separated from the bent portion 24*a* of the winding wire 24. For example, the temperature sensor 6 may be disposed in the vicinity of the bent portion 24*a* of the winding wire 24 via the resin 90. Thus, the temperature of the bent portion 24*a* of the winding wire 24 can be detected via the resin 90.

In the above-described embodiment, although the example in which the circuit substrate 7 for controlling the driving of the dynamo-electric machine 1 (201) is provided, and the circuit substrate 7 is disposed inward of the outer end of the case 4 (204) in the axial direction and is disposed between the stator 2 and the end cover 5 has been described, the present invention is not limited thereto. For example, the circuit substrate 7 may be disposed outside the outer end of the case 4 (204) in the axial direction.

In the above-described embodiment, although the example in which the first insulator 21 has the substrate-side contact portion 82 that comes into contact with the surface of the circuit substrate 7 on the stator 2 side has been described, the present invention is not limited thereto. For example, the first insulator 21 may not have the substrate-side contact portion 82. For example, the circuit substrate 7 may be supported by a support portion different from the substrate-side contact portion 82.

In the above-described embodiment, although the example in which the circuit substrate 7 has the plurality of engaging portions 72A to 72C disposed at intervals in the circumferential direction, and the first insulator 21 has the engaging portions 84A to 84C that engage with the circuit substrate 7 through each of the plurality of engaging portions 72A to 72C has been described, the present invention is not limited thereto. For example, the first insulator 21 may not have the engaging portions 84A to 84C. For example, the circuit substrate 7 may be engaged by an engaging portion different from the engaging portions 84A to 84C.

In the above-described embodiment, although the example in which the gaps between the case 4 (204) and the insulators 21 and 22 and between the plurality of protruding portions 20*b* in the stator core 20 are filled with the resin 90, and the case 4 (204), the stator 2 and the temperature sensor 6 are integrated has been described, the present invention is not limited thereto. For example, the gaps between the case 4 and the insulators 21 and 22 and between the plurality of protruding portions 20*b* in the stator core 20 may not be filled with the resin 90. For example, the case 4 (204), the stator 2, and the temperature sensor 6 may be integrated by a coupling member different from the resin 90.

In the above-described embodiment, although the example in which the resin sheet 10 is provided on the other side of the stator 2 in the axial direction has been described, the present invention is not limited thereto. For example, the resin sheet 10 may not be provided on the other side of the stator 2 in the axial direction. For example, an insulation sheet such as insulating paper may be provided instead of the resin sheet 10. For example, the constitution for insulating the coil 23 may be changed according to design specifications.

In the above-described embodiment, although the example in which the circuit substrate 7 has the resistor 75 for detecting the current supplied to the coil 23, and the resistor 75 is disposed on the surface of the circuit substrate 7 on the end cover 5 side has been described, the present invention is not limited thereto. For example, the resistor 75 may be disposed on the surface of the circuit substrate 7 on the stator 2 side. For example, a substrate (for example, a heat shield plate) different from the circuit substrate 7 may be interposed between the coil 23 which is a heat generation source and the resistor 75.

In the above-described embodiment, although the example in which the dynamo-electric machine 1 (201) includes the first insulation sheet 8 which is disposed between the circuit substrate 7 and the stator 2 and insulates the circuit substrate 7 and the coil 23, and the second insulation sheet 9 which is disposed between the circuit substrate 7 and the end cover 5 and insulates the circuit substrate 7 and the end cover 5 has been described, the present invention is not limited thereto. For example, the dynamo-electric machine 1 (201) may include one that can obtain the same effect instead of the first insulation sheet 8 and the second insulation sheet 9. For example, the dynamo-electric machine 1 (201) may include a resin sheet in place of each of the first insulation sheet 8 and the second insulation sheet 9. For example, the constitution for insulating the circuit substrate 7 and the coil 23 and the constitution for insulating the circuit substrate 7 and the end cover 5 may be changed according to design specifications.

In the above-described embodiment, although the example in which each of the first insulation sheet 8 and the second insulation sheet 9 has a LOI value higher than 20.8% in an environment of 220° C. has been described, the present invention is not limited thereto. For example, each of the first insulation sheet 8 and the second insulation sheet 9 may have a LOI value of 20.8% or less in the environment of 220° C.

In the above-described embodiment, although the example in which the first insulator 21 has the sheet-side contact portion 81 that comes into contact with the surface of the first insulation sheet 8 on the stator 2 side has been described, the present invention is not limited thereto. For example, the first insulator 21 may not have the sheet-side contact portion 81. For example, the first insulation sheet 8 may be supported by a support portion different from the sheet-side contact portion 81.

In the above-described embodiment, although the example in which the second insulation sheet 9 is sandwiched between the opening portion of the case 4 (204) on one side and the tip end of the cylindrical portion 50 of the end cover 5 has been described, the present invention is not limited thereto. For example, the second insulation sheet 9 may be supported by a support portion different from the opening portion of the case 4 (204) on one side and the tip end of the cylindrical portion 50 of the end cover 5.

In the above-described embodiment, although the example in which each of the first insulation sheet 8 and the second insulation sheet 9 is formed of aramid fibers and has a thickness of 0.25 mm or more has been described, the present invention is not limited thereto. For example, the material and thickness of each of the first insulation sheet 8 and the second insulation sheet 9 may be changed according to design specifications.

In the above-described embodiment, although the example in which only one temperature sensor 6 is provided has been described, the present invention is not limited thereto. For example, a plurality of temperature sensors 6 may be provided. For example, the number of temperature sensors 6 installed may be changed according to design specifications.

In the above-described embodiment, although the example in which the circuit substrate 7 includes one resistor 75, three FETs 76A to 76C, and three magnetic sensors 77A to 77C has been described, the present invention is not limited thereto. For example, a plurality of resistors 75 may be provided. For example, the FETs 76A to 76C may be provided with a number other than three. For example, the magnetic sensors 77A to 77C may be provided with a number other than three. For example, the number of resistors 75, FETs 76A to 76C, magnetic sensors 77A to 77C, and encoder 78 installed may be changed according to design specifications.

In addition, it is possible to replace the constituent elements in the above-described embodiment with well-known constituent elements without departing from the spirit of the present invention. Further, each of the above-described modified examples may be combined.

BRIEF DESCRIPTION OF THE REFERENCE SYMBOLS

1 Dynamo-electric machine
2 Stator
3 Rotor
4 Bottomed tubular case (case)
5 End cover
6 Temperature sensor
7, 7A, 7B, 7C Circuit substrate
10 Resin sheet
20 Stator core
20*b* Protruding portion
21 First insulator (insulator)
23 Coil
24 Winding wire
24*a* Bent portion
41 Open end on one side
42 Bottom portion
72A First engaging portion (engaging portion)
72B Second engaging portion (engaging portion)
72C Third engaging portion (engaging portion)
75 Resistor
76A First FET (field-effect transistor)
76B Second FET (field-effect transistor)
76C Third FET (field-effect transistor)
78 Encoder
82 Substrate-side contact portion (contact portion)
84A First engaging portion (engaging portion)
84B Second engaging portion (engaging portion)
84C Third engaging portion (engaging portion)
90 Resin
91 Space (internal space of stator)
201 Dynamo-electric machine
204 Tubular case (case)
215 Front cover
245 Open end on the other side

The invention claimed is:

1. A dynamo-electric machine comprising:
a tubular stator;
a rotor disposed in an internal space of the stator;
a tubular or bottomed tubular case configured to accommodate the stator;
an end cover mounted on an open end of the case on one side; and
a temperature sensor,
wherein the stator includes a stator core having a plurality of protruding portions that protrude toward a center of the stator, an insulator mounted on the stator core, and a coil formed by winding a winding wire around each of the plurality of protruding portions with the insulator therebetween,
the temperature sensor is disposed on the end cover side of the stator between bent portions of the winding wires in the two coils adjacent to each other in a circumferential direction,
the temperature sensor is in contact with each of the bent portions of the winding wires in the two coils adjacent to each other in the circumferential direction, and
a resin is filled around a contact portion between the bent portion of the winding wire and the temperature sensor.

2. The dynamo-electric machine according to claim 1, further comprising a circuit substrate configured to control driving of the dynamo-electric machine,
wherein the circuit substrate is disposed inward of an outer end of the case in an axial direction and is also disposed between the stator and the end cover.

3. The dynamo-electric machine according to claim 2, wherein the insulator has a contact portion that comes into contact with a surface of the circuit substrate on the stator side.

4. The dynamo-electric machine according to claim 2, wherein the circuit substrate has a plurality of engaging portions disposed at intervals in a circumferential direction, and
the insulator has an engaging portion that engages with the circuit substrate through each of the plurality of engaging portions.

5. The dynamo-electric machine according to claim 1, wherein gaps between the case and the insulator and between the plurality of protruding portions in the stator core are filled with a resin, and the case, the stator and the temperature sensor are integrated.

6. The dynamo-electric machine according to claim 1, wherein the case is a tubular case having a tubular shape, and further includes a front cover mounted on an open end of the tubular case on the other side and a resin sheet disposed between the front cover and the stator.

7. The dynamo-electric machine according to claim 1, wherein the case is a bottomed tubular case having a bottom portion on the other side, and further includes a resin sheet disposed between the bottom portion and the stator.

8. The dynamo-electric machine according to claim 1, further comprising a circuit substrate configured to control driving of the dynamo-electric machine,
wherein the circuit substrate includes a resistor that detects a current supplied to the coil, and
the resistor is provided on a surface of the circuit substrate on the end cover side.

9. A dynamo-electric machine comprising:
a tubular stator;
a rotor disposed in an internal space of the stator;
a tubular or bottomed tubular case configured to accommodate the stator; and
an end cover mounted on an open end of the case on one side, wherein the stator includes a stator core having a plurality of protruding portions that protrude toward a center of the stator, an insulator mounted on the stator core, and a coil formed by winding a winding wire around each of the plurality of protruding portions with the insulator therebetween, a circuit substrate configured to control driving of the dynamo-electric machine is further included, the circuit substrate includes a resistor that detects a current supplied to the coil, the resistor is provided on a surface of the circuit substrate on the end cover side, the circuit substrate further includes three field-effect transistors and an encoder, the three field-effect transistors and the encoder are provided on a surface of the circuit substrate on the end cover side, in a plan view, the respective three field-effect transistors are consecutively disposed adjacent to each other in a circumferential direction, and in a plan view, the encoder is disposed between the field-effect transistor located on a leftmost side among the three field-effect transistors and the resistor in the circumferential direction.

10. A dynamo-electric machine comprising:
a tubular stator;
a rotor disposed in an internal space of the stator;
a tubular or bottomed tubular case configured to accommodate the stator; and
an end cover mounted on an open end of the case on one side, wherein the stator includes a stator core having a plurality of protruding portions that protrude toward a center of the stator, an insulator mounted on the stator core, and a coil formed by winding a winding wire around each of the plurality of protruding portions with the insulator therebetween, a circuit substrate configured to control driving of the dynamo-electric machine is further included, the circuit substrate includes a resistor that detects a current supplied to the coil, the resistor is provided on a surface of the circuit substrate on the end cover side, the circuit substrate further includes three field-effect transistors and an encoder, the three field-effect transistors and the encoder are provided on a surface of the circuit substrate on the end cover side, in a plan view, each of the three field-effect transistors is continuously disposed adjacent to each other in a circumferential direction, and in a plan view, the resistor is disposed between the field-effect transistor located on a leftmost side among the three field-effect transistors and the encoder in the circumferential direction.

* * * * *